United States Patent
Hatakeyama et al.

(10) Patent No.: US 11,142,640 B2
(45) Date of Patent: Oct. 12, 2021

(54) SILICON-CONTAINING COMPOUND, URETHANE RESIN, STRETCHABLE FILM AND METHOD FOR FORMING THE SAME

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP); Yuji Harada, Joetsu (JP); Shiori Nonaka, Joetsu (JP); Koji Hasegawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 351 days.

(21) Appl. No.: 16/268,786

(22) Filed: Feb. 6, 2019

(65) Prior Publication Data
US 2019/0264028 A1 Aug. 29, 2019

(30) Foreign Application Priority Data
Feb. 26, 2018 (JP) ............................. JP2018-031890

(51) Int. Cl.
*C08L 75/16* (2006.01)
*C08G 18/50* (2006.01)
(Continued)

(52) U.S. Cl.
CPC ............. *C08L 75/16* (2013.01); *B01J 35/004* (2013.01); *C08F 220/1811* (2020.02); *C08F 290/062* (2013.01); *C08F 290/067* (2013.01); *C08G 18/3206* (2013.01); *C08G 18/3212* (2013.01); *C08G 18/3893* (2013.01); *C08G 18/48* (2013.01); *C08G 18/4808* (2013.01); *C08G 18/4825* (2013.01); *C08G 18/4833* (2013.01); *C08G 18/4854* (2013.01); *C08G 18/5096* (2013.01); *C08G 18/6674* (2013.01); *C08G 18/6677* (2013.01); *C08G 18/672* (2013.01); *C08G 18/73* (2013.01); *C08G 18/755* (2013.01); *C08G 18/758* (2013.01); *C08G 18/7614* (2013.01); *C08G 18/792* (2013.01);
(Continued)

(58) Field of Classification Search
CPC ............ C08G 18/6677; C08G 18/3893; C08G 18/755; C08G 18/4833; C08G 18/758; C08G 18/4808; C08G 18/5096; C08G 18/4854; C08G 18/4825; C08G 18/7614; C08G 18/6674; C08G 18/792; C08G 18/73; C08G 18/797; C08G 18/672; C08G 18/3206; C08G 18/3212; C08G 18/48; C07F 7/0838; C08F 290/062; C08F 220/1811; C08F 290/067; C09D 151/08; C09D 175/08; C09D 175/16;
B01J 35/004; C08L 75/16; C08L 2203/02; C08L 2203/16; C08K 5/5419; C08J 5/18; C08J 2375/16
See application file for complete search history.

(56) References Cited

U.S. PATENT DOCUMENTS

2017/0335076 A1    11/2017   Hatakeyama et al.

FOREIGN PATENT DOCUMENTS

| JP | H05-097868 A | 4/1993 |
|---|---|---|
| JP | 2583412 B2 | 2/1997 |

(Continued)

OTHER PUBLICATIONS

Jul. 18, 2019 Extended European Search Report issued in European Patent Application No. 19155411.2.

*Primary Examiner* — Angela C Scott
(74) *Attorney, Agent, or Firm* — Oliff PLC

(57) ABSTRACT

This is to provide a stretchable film having excellent stretchability and strength and excellent water repellency on the surface of the film, a method for forming the same, a urethane resin used for the stretchable film and a silicon-containing compound as a material of the urethane resin. A silicon-containing compound represented by the following general formula (1),

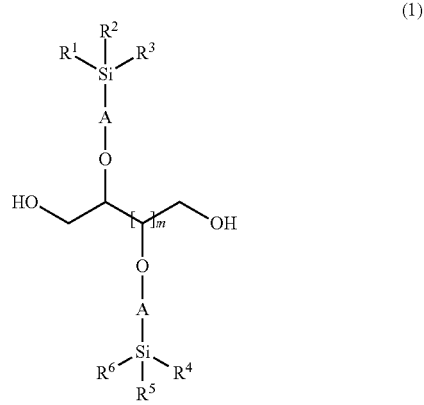

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by —$(OSiR^7R^8)_n$—$OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

11 Claims, 4 Drawing Sheets

(51) Int. Cl.
  C08J 5/18      (2006.01)
  C08K 5/5419    (2006.01)
  C08G 18/38     (2006.01)
  C08G 18/48     (2006.01)
  C08F 290/06    (2006.01)
  C08G 18/67     (2006.01)
  C08G 18/79     (2006.01)
  C08G 18/73     (2006.01)
  C09D 175/08    (2006.01)
  C09D 175/16    (2006.01)
  C08G 18/32     (2006.01)
  B01J 35/00     (2006.01)
  C08G 18/66     (2006.01)
  C08G 18/75     (2006.01)
  C09D 151/08    (2006.01)
  C08G 18/76     (2006.01)
  C08F 220/18    (2006.01)

(52) U.S. Cl.
  CPC .............. *C08G 18/797* (2013.01); *C08J 5/18* (2013.01); *C08K 5/5419* (2013.01); *C09D 151/08* (2013.01); *C09D 175/08* (2013.01); *C09D 175/16* (2013.01); *C08J 2375/16* (2013.01); *C08L 2203/02* (2013.01); *C08L 2203/16* (2013.01)

(56) References Cited

FOREIGN PATENT DOCUMENTS

| | | |
|---|---|---|
| JP | 2624060 B2    | 6/1997  |
| JP | 2004-033468 A | 2/2004  |
| JP | 2011-194757 A | 10/2011 |
| JP | 2012-152725 A | 8/2012  |
| JP | 2013-139534 A | 7/2013  |

[FIG.1]
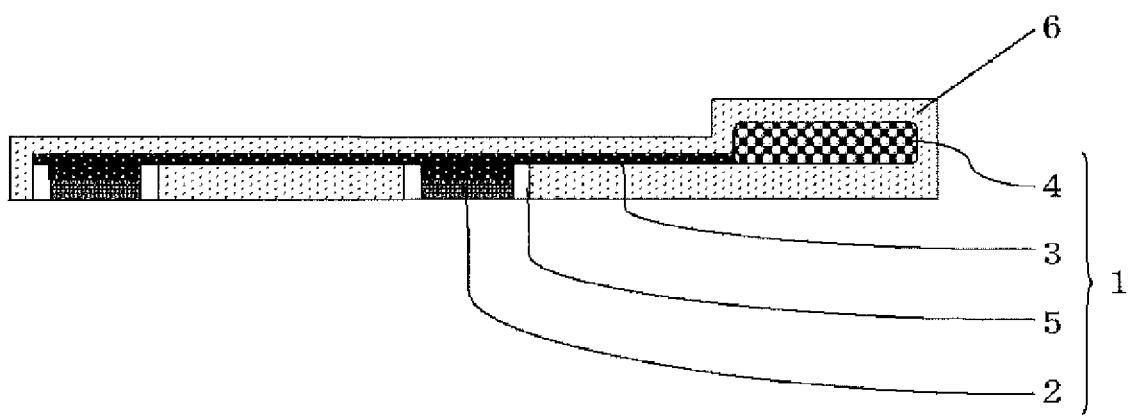
[FIG.2]
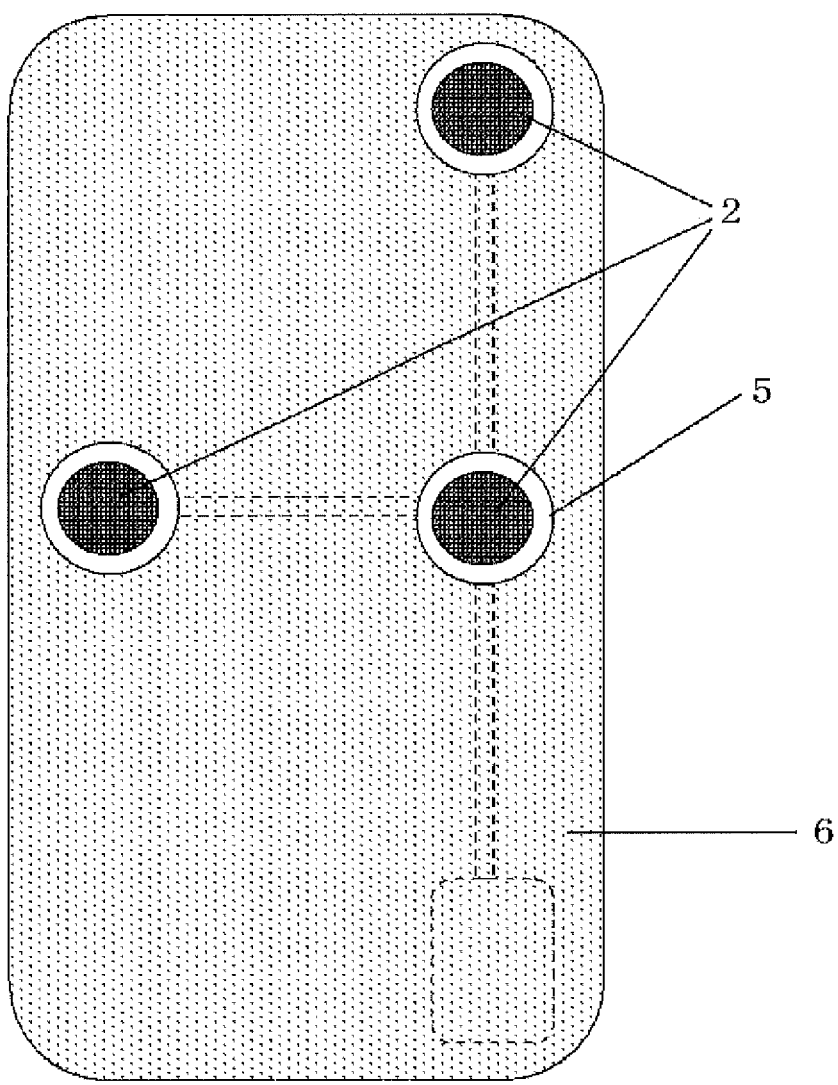

[FIG.3]
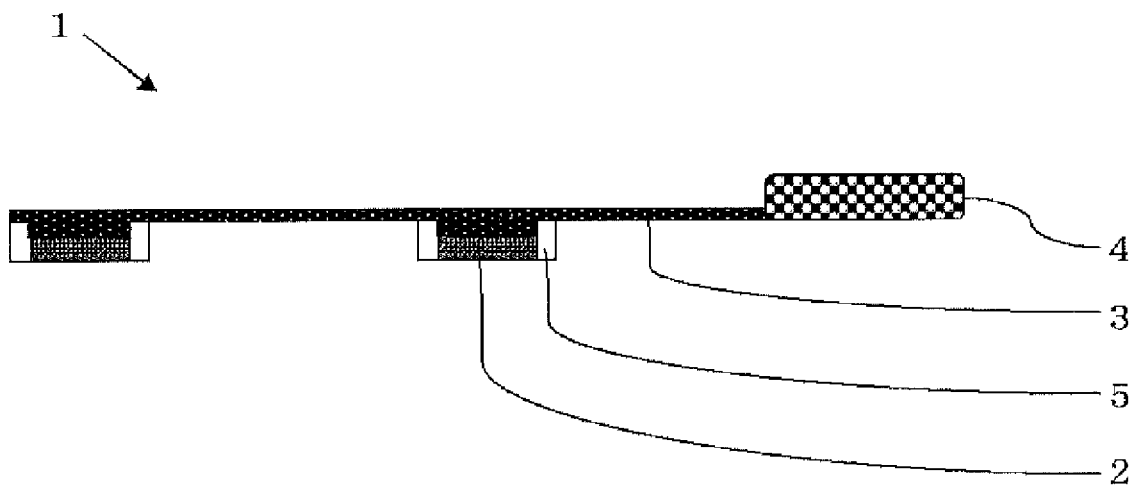
[FIG.4]
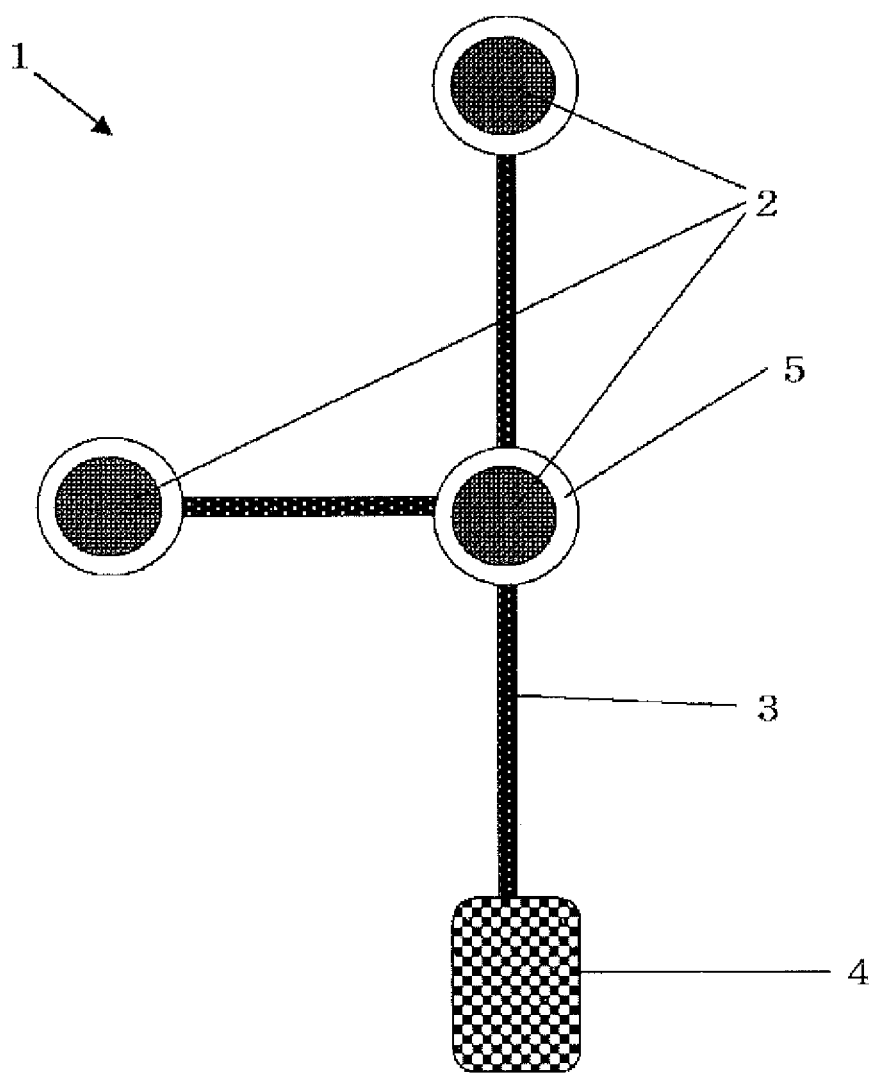

[FIG.5]
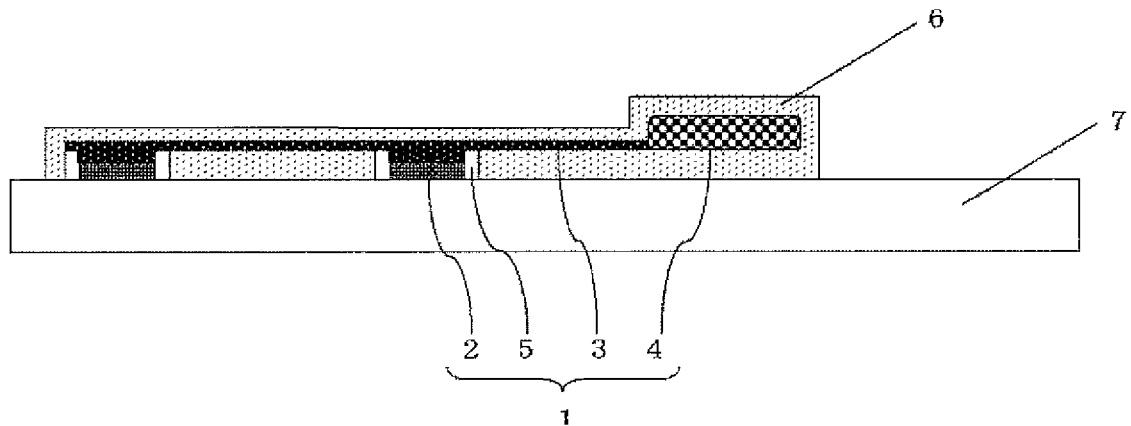
[FIG.6]
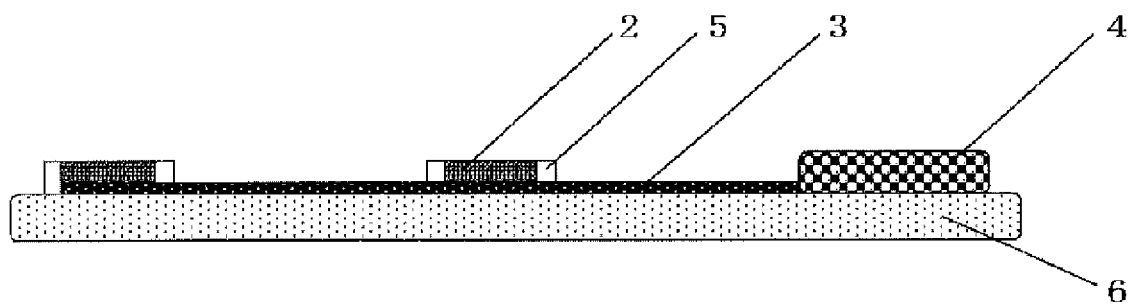
[FIG.7]
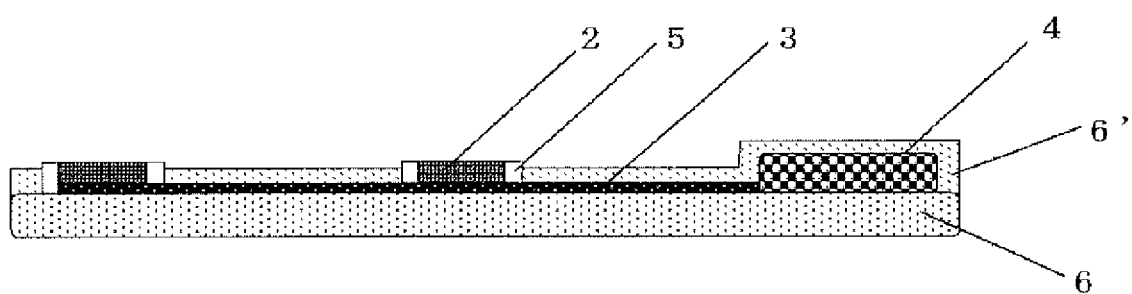
[FIG.8]
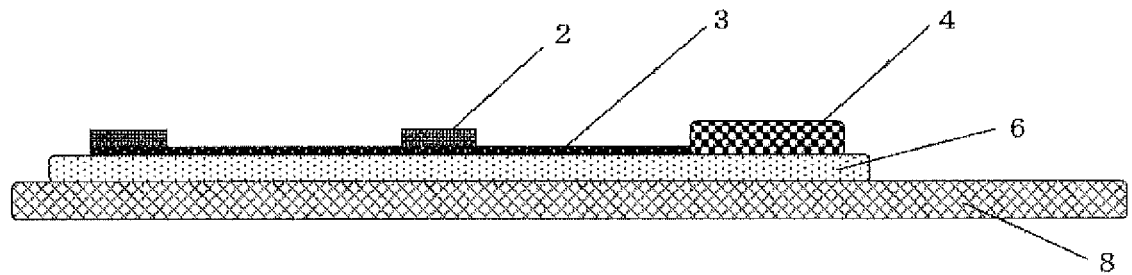

[FIG.9]
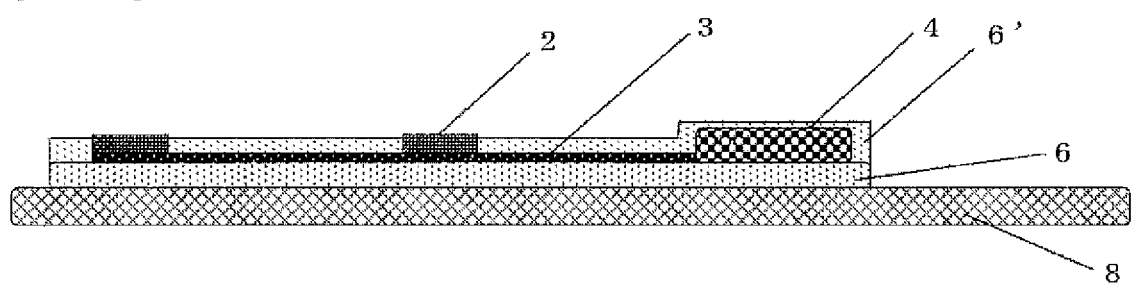

SILICON-CONTAINING COMPOUND, URETHANE RESIN, STRETCHABLE FILM AND METHOD FOR FORMING THE SAME

TECHNICAL FIELD

The present invention relates to a stretchable film having all of stretchability, strength and water repellency, a method for forming the same, a urethane resin used for the stretchable film and a silicon-containing compound which becomes a material of the urethane resin.

BACKGROUND ART

In recent years, wearable devices are being developed with the spread of IoT (Internet of Things). Watch and glasses that can connect to the Internet are typical examples. In addition, in the medical field and the sports field, a wearable device capable of constantly monitoring the state of the body is required, which is a future growth field.

As a wearable device, a mode of sticking to the body and monitoring the state of the body at all times is shown. Such a wearable device usually comprises a bioelectrode for detecting an electric signal from the body, a wiring for transmitting an electric signal to a sensor, a semiconductor chip as a sensor and a battery. Also, an adhesive pad for adhesion to the skin is also usually required. The structures of the bioelectrode and surrounding wires, and the adhesive pad are disclosed in detail in Patent Document 1. The wearable device disclosed in Patent Document 1 is so constituted that a silicone type adhesive film is disposed around the bioelectrode, and a stretchable silver wiring in the form of a bellows covered with a stretchable urethane film is provided between the bioelectrode and the sensor device.

The urethane film has high stretchability and strength, and it has excellent mechanical properties as a coating film of stretchable wiring. However, the urethane film has hydrolyzability, so that there is a disadvantage that stretchability and strength are lowered by hydrolysis. On the other hand, in the silicone film, there is no hydrolyzability, but there is a disadvantage of low strength.

Thus, a silicone urethane polymer having both of a urethane bond and a siloxane bond in a polymer main chain has been investigated. The cured product of this polymer is higher in strength than silicone alone and lower in hydrolyzability than polyurethane alone. However, with this cured product of the polymer, the strength of the polyurethane alone and the water repellency of the silicone alone are not attained, and only the strength and the water repellency between the silicone and the polyurethane can be obtained.

On the other hand, a material blended with polyurethane and silicone has also been studied. For example, in Patent Document 2 or Patent Document 3, there are disclosed materials in which silicone having no reactivity and cross-linkable polyurethane are blended. When a film is formed from such a material, silicone floats (bleeds out) on the surface of the film of the cured polyurethane, and the water repellency of the surface of the film is improved. However, with such a film, silicone is not crosslinked so that there is a problem that silicone on the surface of the film peels off and water repellency tends to decrease. In addition, silicone does not float on the surface of the film unless the surface is present, so when both sides are sandwiched between sheets and compression-molded, water repellency is not high.

Also, a diol material for synthesizing polyurethane having siloxane in the side chain has been proposed. In Patent Documents 4 and 5, there are shown diol compounds for forming a polyurethane having silicone in the side chain. The side chain-silicone group shown here is a linear silicone in which the terminal of the siloxane is bonded to the diol compound.

CITATION LIST

Patent Literature

Patent document 1: JP 2004-033468A
Patent document 2: JP 2011-194757A
Patent document 3: JP 2013-139534A
Patent document 4: JP Patent No. 2,583,412
Patent document 5: JP Patent No. 2,624,060

SUMMARY OF INVENTION

Technical Problem

Under such circumstances, it has been desired to develop a stretchable film having excellent stretchability and strength similar to that of the polyurethane and having excellent water repellency similar to that of the silicone, and a method for forming the same.

Solution to Problem

The present invention has been made to solve the above problems, and it is an object to provide a stretchable film having excellent stretchability and strength and excellent water repellency on the surface of the film, a method for forming the same, a urethane resin to be used for the stretchable film, and a silicon-containing compound to be a material of the urethane resin.

In order to solve the above problems, in the present invention, a silicon-containing compound represented by the following general formula (1) is provided,

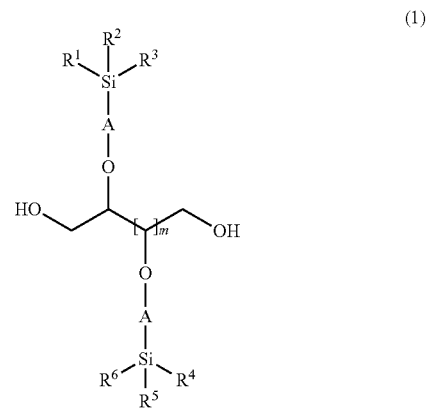

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

When such a silicon-containing compound of the present invention is employed, it becomes a silicon-containing compound preferably used for a material of a urethane resin which is used for a stretchable film having excellent stretchability and strength and also excellent water repellency on the surface of the film.

It is also preferable that the silicon-containing compound of the general formula (1) is a material represented by the following general formula (2),

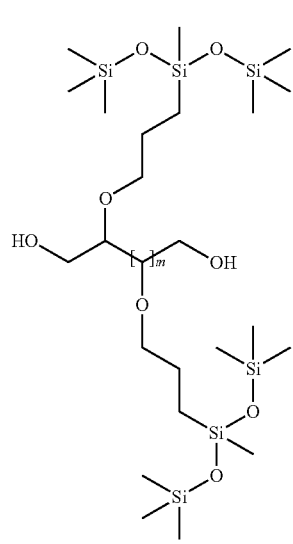
(2)

wherein, "m" is the same meaning as before.

When such a silicon-containing compound is employed, it becomes a silicon-containing compound preferably used for a material of a urethane resin which used for a stretchable film with less reduction in strength and more excellent in water repellency.

The present invention is further to provide a urethane resin having a structure represented by the following general formula (3),

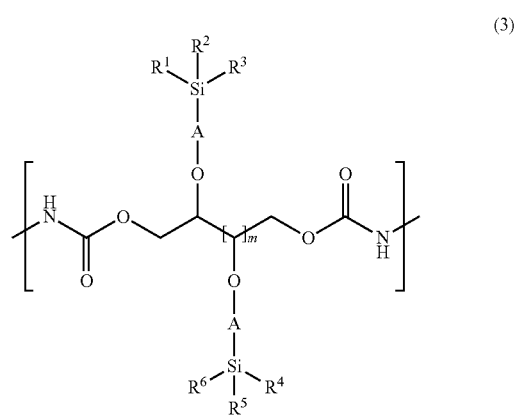
(3)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

When such a urethane resin is employed, it becomes a urethane resin which is suitably used for a stretchable film having excellent stretchability and strength and also excellent in water repellency on the surface of the film.

It is also preferable that the polymer has a structure represented by the following general formula (4) having a (meth)acrylate group at the terminal,

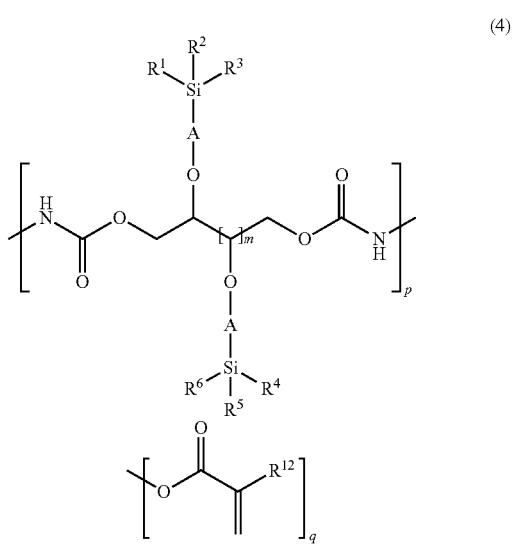
(4)

wherein, $R^1$ to $R^6$, A, and "m" represent the same meanings as before; $R^{12}$ is a hydrogen atom or a methyl group; and "p" and "q" are numbers of units in one molecule and are integers in the range of $1 \leq p \leq 100$, and $1 \leq q \leq 3$.

When such a material having a structure which has a (meth)acrylate group at the end thereof is employed, it becomes a urethane resin which is suitably used for a stretchable film having more excellent stretchability and strength and excellent water repellency on the surface of the film.

Moreover, the present invention is to provide a stretchable film containing the urethane resin.

When such a stretchable film is employed, it becomes a stretchable film having more excellent stretchability and strength and excellent water repellency on the surface of the film.

Furthermore, it is preferable that the stretchable film is a material having a stretching property of 40 to 500% in a tensile test regulated by JIS K 6251.

When such a stretchable film having a stretching property is employed, it can be particularly suitably used as a coating film of a stretchable wiring.

It is preferable that the stretchable film is used as a film which is in contact with a conductive wire having stretchability.

The stretchable film of the present invention can be suitably used particularly for such applications.

The present invention is also to provide a method for forming a stretchable film which comprises, mixing a silicon-containing compound represented by the following general formula (1) and a compound having an isocyanate group(s), forming a film of the mixture, and curing the film by heating,

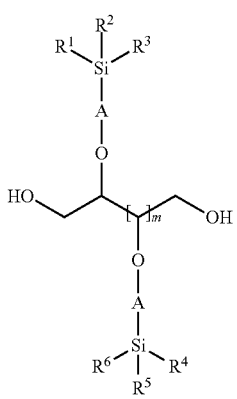

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

When the method for forming the stretchable film as in the present invention is employed, a stretchable film having excellent stretchability and strength and excellent water repellency on the surface of the film can be easily formed.

In the present invention, there is provided a method for forming a stretchable film, which comprises forming a film of a compound having a (meth)acrylate group at the terminal represented by the following general formula (4), and curing the film by heating and/or irradiating light,

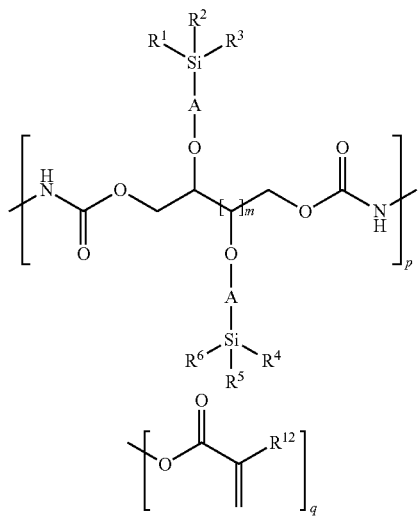

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; $R^{12}$ represents a hydrogen atom or a methyl group; "m" is an integer in the range of 1 to 3; and "p", and "q" are numbers of units in one molecule and are integers in the range of $1 \leq 1p \leq 100$, and $1 \leq q \leq 3$.

In the method for forming a stretchable film of the present invention, it is also possible to combine thermal curing and photocuring in this way.

Advantageous Effects of Invention

As mentioned above, when the stretchable film of the present invention is employed, it becomes a highly water repellent stretchable film having excellent stretchability and strength which are the same as those of the polyurethane, and having excellent water repellency on the surface of the film which is the same as or better than that of the silicone the main chain of which is a siloxane bond. Also, the urethane resin of the present invention is suitably used for such a stretchable film. Further, the silicon-containing compound of the present invention is suitably used as a material for such a urethane resin. The stretchable film of the present invention comprises a urethane resin in which two or more silicon-containing groups are attached to the side chain as a base, so that two or more silicon-containing group attached to the side chain heighten water repellency of the stretchable film efficiently with a small amount, and the urethane bond in the main chain can heighten stretchability and strength of the stretchable film. In addition, the two or more silicon-containing groups of side chains are always oriented to the surface side of the stretchable film, so that, for example, even when the stretchable film is formed in the state of being hermetically sealed while sandwiching the both sides of the composition for forming the stretchable film with sheets, it becomes a material having high water repellency. When it is a stretchable wiring film obtained by contacting such a stretchable film with a conductive wires or covering one side or both sides of the conductive wires, the resulting material is not only excellent in stretchability and strength, but also excellent in water repellency of the surface. Accordingly, when the stretchable film of the present invention is employed, in a wearable device, it can be particularly suitably used not only for a wiring portion connecting the bioelectrode and the sensor, but also as a stretchable film capable of placing all the bioelectrode and the sensor. Also, according to the method for forming a stretchable film of the present invention, it is possible to form a highly water repellent stretchable film having excellent stretchability and strength which are the same as those of the polyurethane, and having excellent water repellency on the surface of the film which is the same as or better than that of the silicone the main chain of which is a siloxane bond.

BRIEF DESCRIPTION OF DRAWINGS

FIG. 1 is a cross-sectional view showing an electrocardiograph in a state that it is covered with a stretchable film of the present invention;

FIG. 2 is a schematic view of the electrocardiograph shown in FIG. 1 as seen from the side of a bioelectrode;

FIG. 3 is a cross-sectional view showing an electrocardiograph in a state before covering with a stretchable film of the present invention;

FIG. 4 is a schematic view of the electrocardiograph shown in FIG. 3 as seen from the side of a bioelectrode;

FIG. 5 is a cross-sectional view showing a state where the electrocardiograph is brought into contact with the substrate and covered with a stretchable film of the present invention;

FIG. 6 is a cross-sectional view showing a state in which a bioelectrode, an adhesive portion and wiring are formed on a stretchable film of the present invention, and a center device is further connected;

FIG. 7 is a cross-sectional view showing a state in which a wiring and the center device of FIG. 6 are covered with the stretchable film of the present invention;

FIG. 8 is a cross-sectional view showing a state in which a stretchable film of the present invention is formed on a cloth, the wiring and electrodes are formed thereon, and a center device is further connected; and FIG. 9 is a cross-sectional view showing a state in which the wiring and the center device of FIG. 8 are covered with the stretchable film of the present invention.

DESCRIPTION OF EMBODIMENTS

As mentioned above, the polyurethane has sufficient stretchability and strength, but it has a disadvantage that it has low water repellency, and strength and stretchability are lowered by hydrolysis, and the silicone has high water repellency but it has a disadvantage that strength is low. Also, in the cured product of a silicone urethane polymer having both of a urethane bond and a siloxane bond in the main chain, strength and water repellency are intermediate between the polyurethane and the silicone, and there is a problem that it is not as high as strength of the polyurethane alone or water repellency of the silicone alone. Further, in the method of forming a film by blending the polyurethane and the silicone, and unevenly distributing the silicone on the surface of the film by baking to increase water repellency, strength of the surface of the film is weak, and when the surface is not present, the silicone is not floated on the surface, so that, there is a disadvantage that water repellency is not improved, for example, in a sealed state while sandwiching both sides with sheets. In addition, in this method, it is necessary to blend a solvent having a boiling point in the range of 100 to 200° C. in order to accelerate the uneven distribution of the surface of the silicone, so that there is a disadvantage that the composition and the film forming process are limited since it is impossible to form a film in the absence of a solvent, and the like. Under such a background, it has been desired to develop a stretchable film having excellent stretchability and strength as high as those of the polyurethane, sufficiently high strength of the surface of the film, and having excellent water repellency and surface hardness equal to or higher than those of the silicone, and a method for forming the same.

Thus, the present inventors have intensively studied to accomplish the above objects, and as a result, they have found that a film excellent in stretchability and strength while having high water repellency comprising, as a base, a resin having an ether group which has high flexibility and 2 to 4 silicon-containing groups which has high water repellency in a side chain, and a urethane bond in a main chain is employed, it becomes a stretchable film having excellent stretchability and strength which are the same as or better than those of the polyurethane, and having excellent water repellency on the surface of the film which is the same as or better than that of the silicone, and is particularly suitable as a coating film of a stretchable wiring in a wearable device, whereby completing the present invention.

The side chain having hydrophobic silicon and a flexible ether group repels against the main chain of the hydrophilic urethane bond and coordinates so that the silicon-containing side chain separates from the urethane bond. There is no side chain that becomes a steric hindrance around the urethane bond, so that the hydrogen bond of urethane bond is retained, and there is a possibility that stretchability and strength rather improves in some cases than deteriorates. The silicon-containing side chain located on the side opposite to the urethane develops high hydrophobicity because it faces outward. According to this constitution, it is possible to form a film having high strength, high stretchability and high water repellency.

That is, the present inventors have found that a film made of a resin having an ether group and silicon in 2 to 4 side chains and having a urethane bond in the main chain has the same stretchability and strength as those of the polyurethane, and high water repellency, and is effective as a film for coating a stretchable bioelectrode.

That is, the present invention is directed to a silicon-containing compound represented by the following general formula (1),

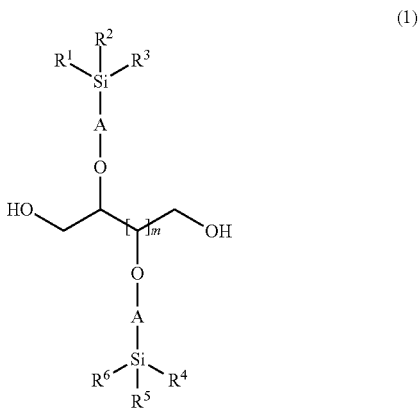

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $—(OSiR^7R^8)_n—OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

Also, the present invention is directed to a urethane resin having a structure represented by the following general formula (3),

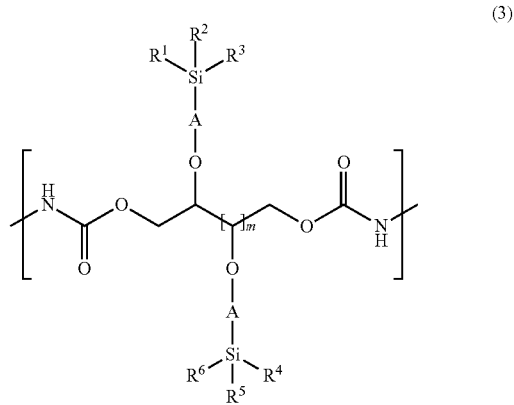

(3)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by —(OSiR$^7$R$^8$) OSiR$^9$R$^{10}$R$^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

Further, the present invention is directed to a method for forming a stretchable film, which comprises mixing a silicon-containing compound represented by the following general formula (1) and a compound having an isocyanate group(s), forming a film of the mixture, and curing the film by heating,

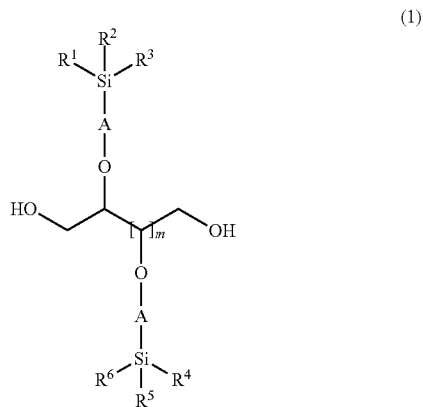

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by —(OSiR$^7$R$^8$)$_n$—OSiR$^9$R$^{10}$R$^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

Hereinafter, the present invention will be explained in detail, but the present invention is not limited thereto.

[Silicon-Containing Compound]

The silicon-containing compound of the present invention is a material represented by the following general formula (1),

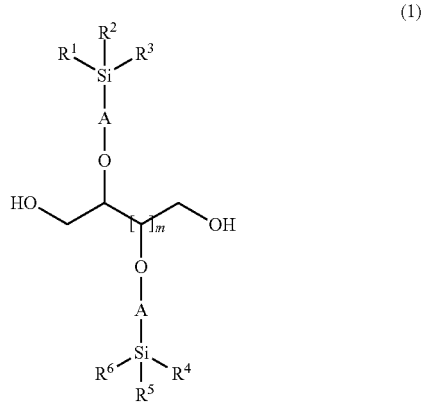

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by —(OSiR$^7$R$^8$)$_n$—OSiR$^9$R$^{10}$R$^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

Specific examples of the alkyl group of $R^1$ to $R^{11}$ include a methyl group, an ethyl group, an n-propyl group, an n-butyl group, an isopropyl group, an isobutyl group, a tert-butyl group, a cyclobutyl group, a cyclopentyl group, a cyclohexyl group and the like.

The diol compound having an ether group and a silicon-containing group in 2 to 4 side chains represented by the general formula (1) can be obtained, for example, by reacting a diol having 2 to 4 ether groups containing double bonds in the side chain, and a silicon compound having a SiH group(s) in the siloxane chain in the presence of a platinum catalyst. The hydroxyl group may remain unprotected but may lower the activity of the platinum catalyst, so it may be protected by a trimethylsilyl group, an acid labile group or the like in advance, and can be deprotected after the reaction.

Both the dialcohol moiety of the diol compound represented by the general formula (1) are primary one, so that it has high reactivity with isocyanate and can easily form a urethane bond represented by the general formula (3) described later. Another advantage of using the primary dialcohol is that the degree of rotational freedom of the urethane bond formed thereby is high, so that the hydrogen bonding between the urethane bonds is increased, thereby it is possible to form a high strength film.

As the method for synthesizing diols having 2 to 4 ether groups containing double bonds in the side chain, there may be mentioned a method in which a material having two primary hydroxyl groups and 2 to 4 secondary hydroxyl groups selected from meso-erythritol, D-threitol, L-threitol, DL-threitol, adonitol, DL-arabitol, D-(+)-arabitol, L-(−)-arabitol, ribitol, xylitol, alitol, galactitol, D-iditol, L-iditol, D-mannitol, L-mannitol, D-sorbitol, L-sorbitol, D-talitol, L-talitol and dulcitol is used as a starting material, two primary hydroxyl groups are protected, secondary hydroxyl groups are alkenyl-etherified, a silicon compound having an alkenyl ether group and a SiH group is reacted to be pendant the silicon-containing group, and then, the primary hydroxyl groups are deprotected. The deprotection of the primary hydroxyl group may be carried out before attaching the silicon-containing group.

Specific examples of the diol compound having an ether group and a silicon-containing group in 2 to 4 side chains are exemplified below.

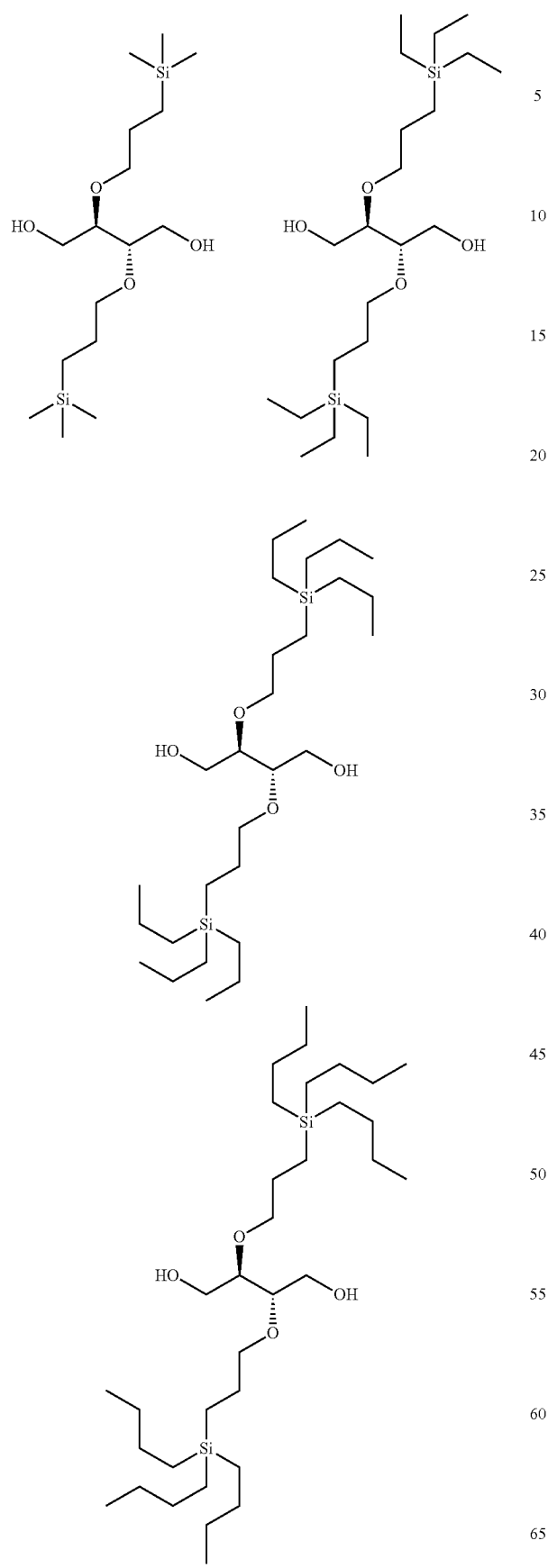

13
-continued
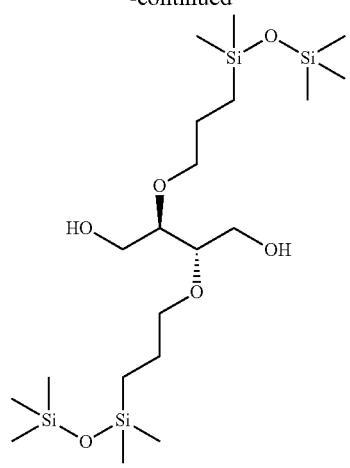
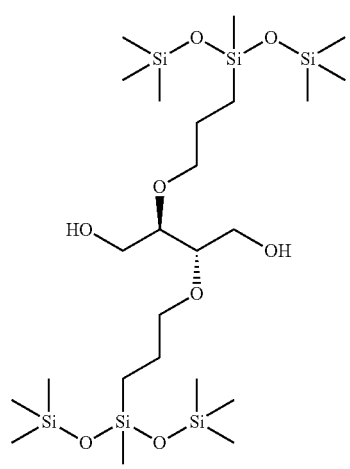
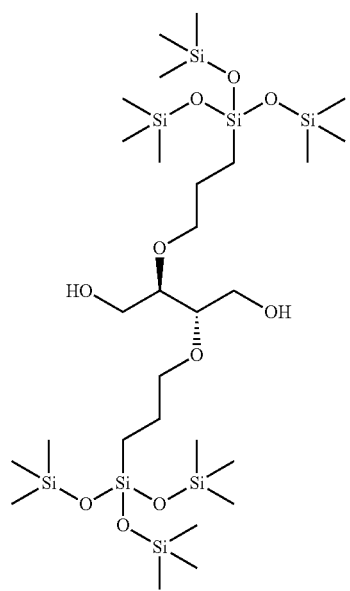
14
-continued
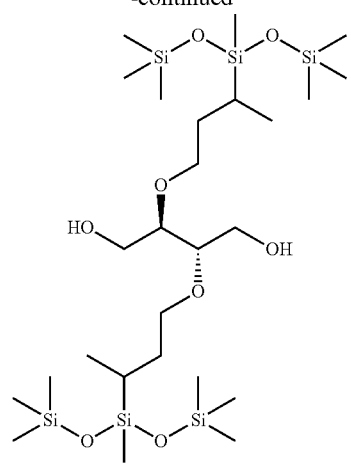
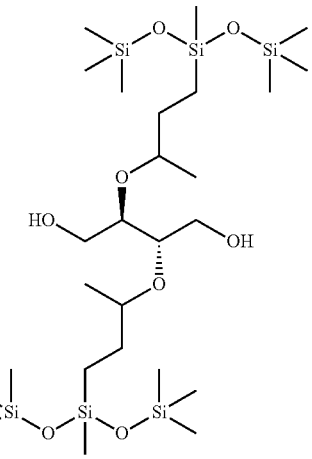
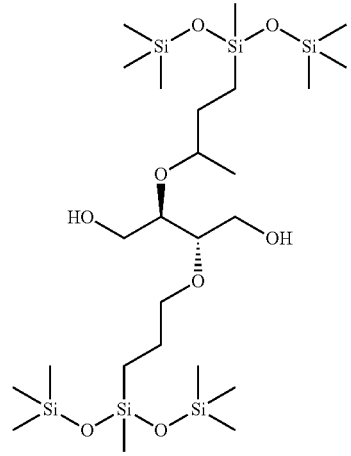

15
-continued
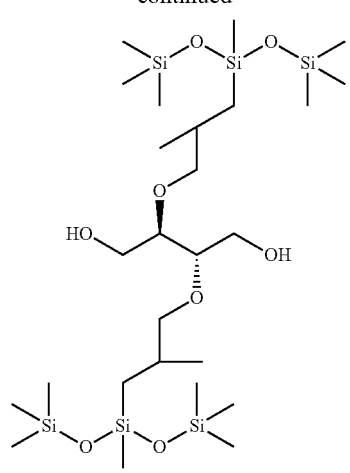
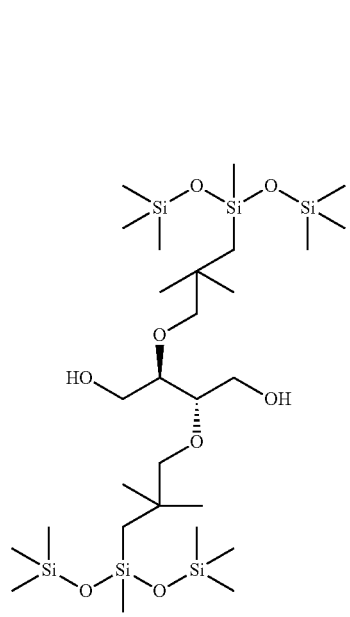
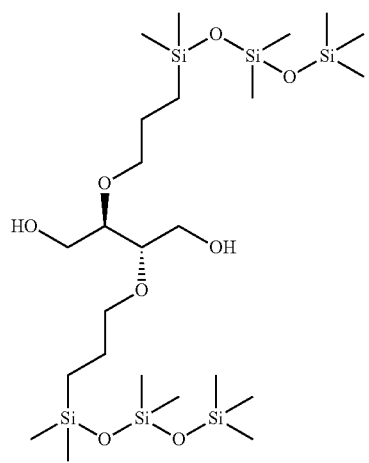
16
-continued
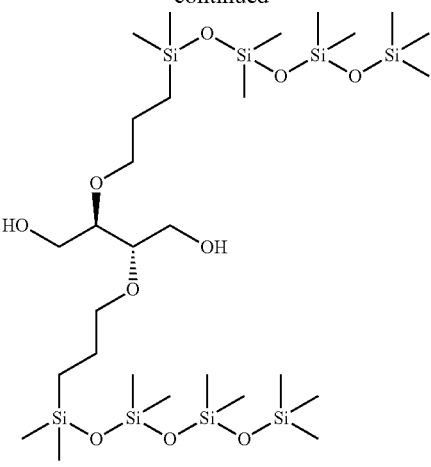
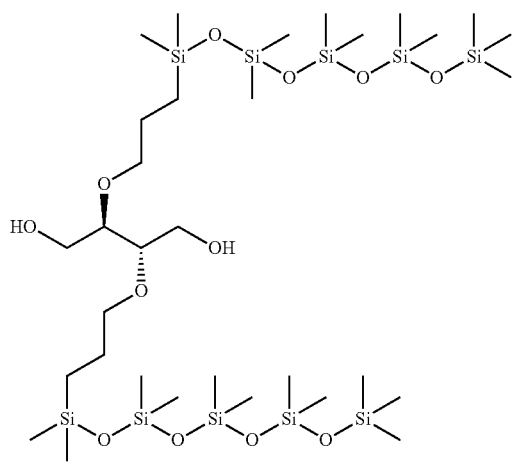
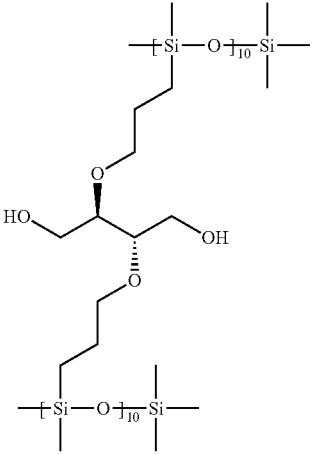

-continued
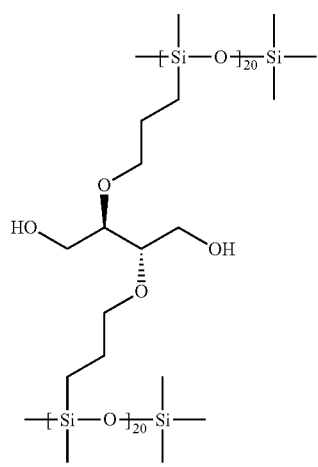
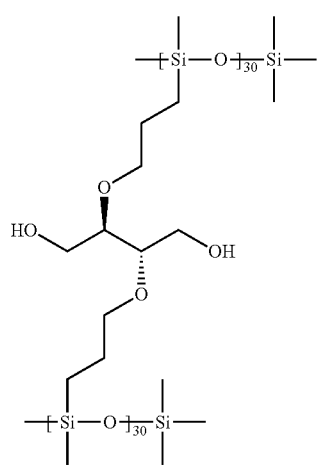
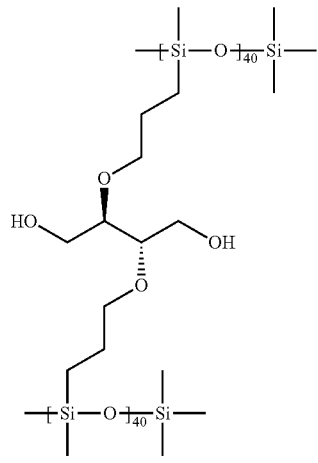
-continued
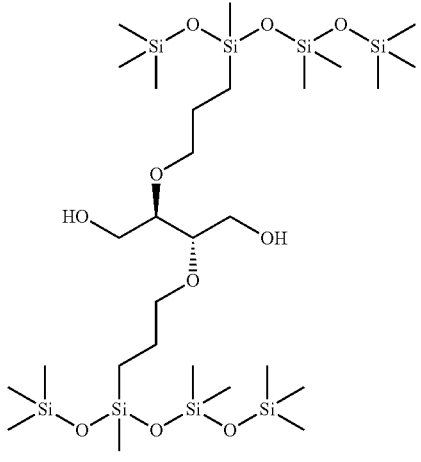
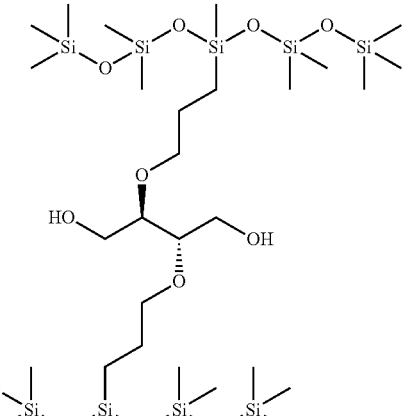
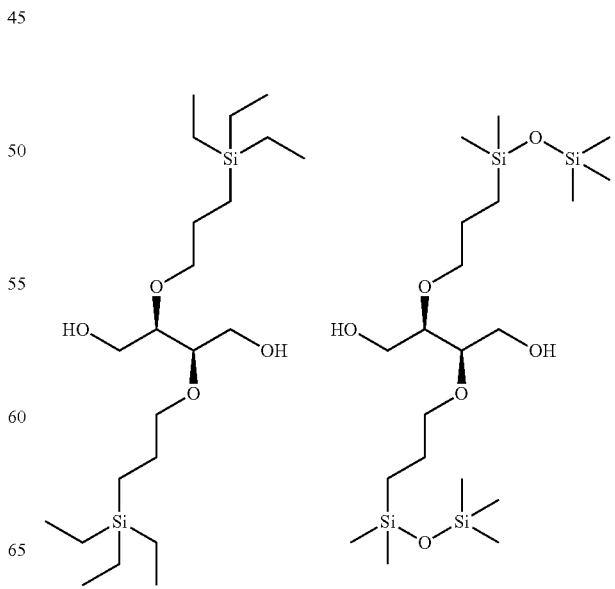

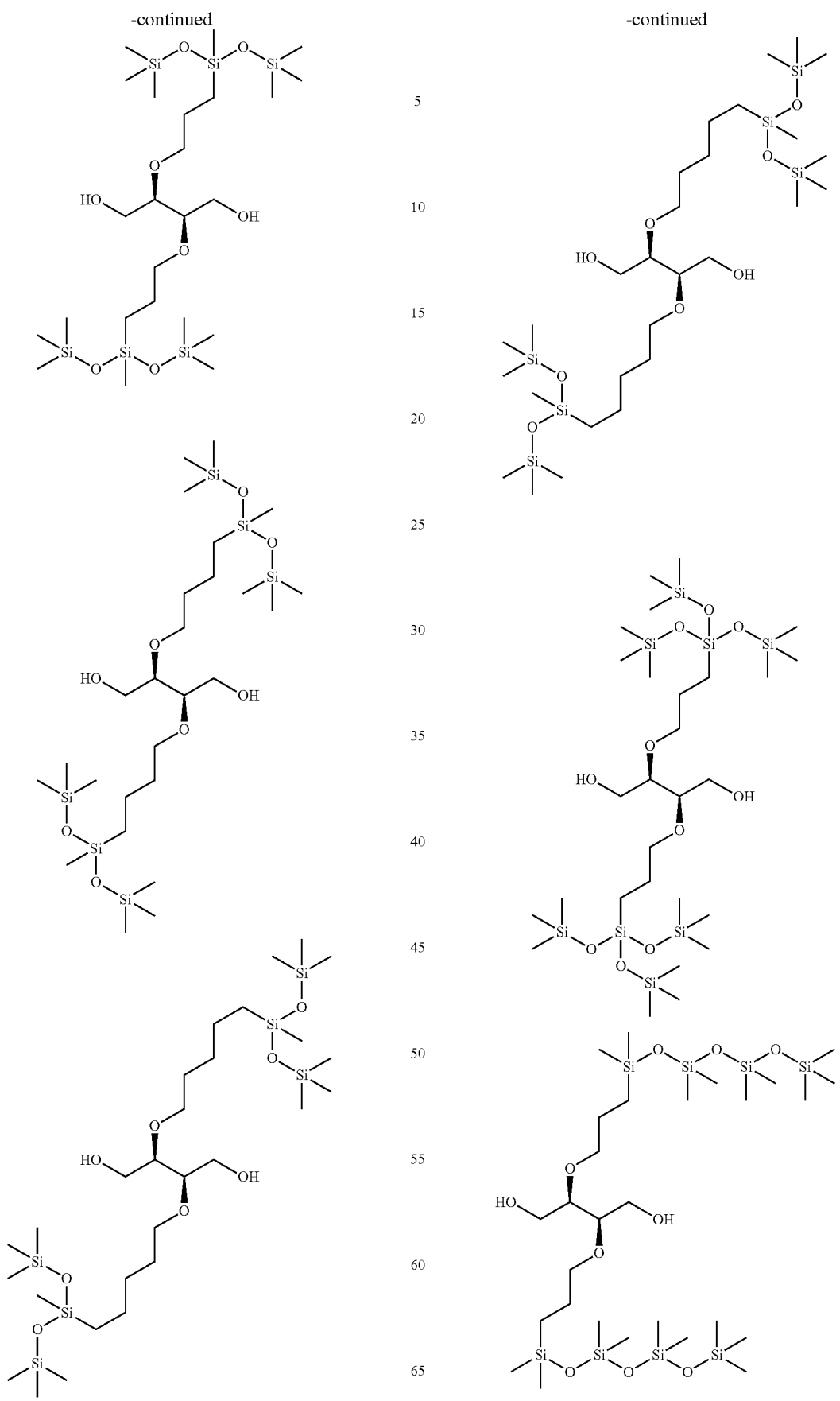

21
-continued
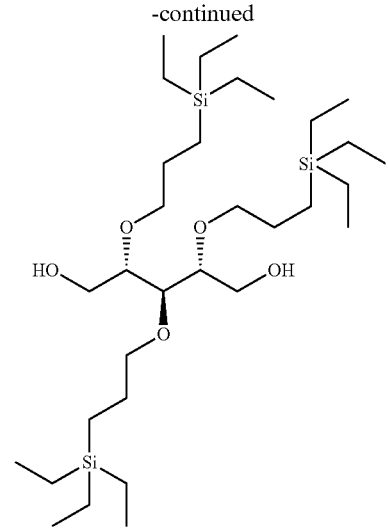
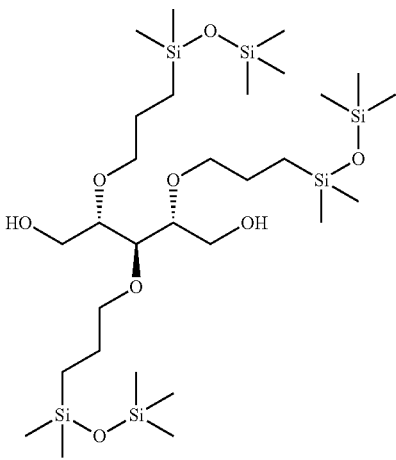
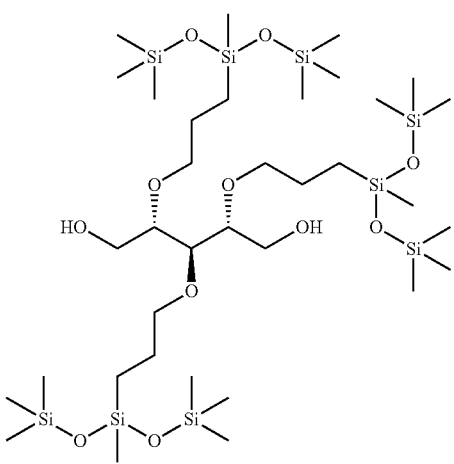
22
-continued
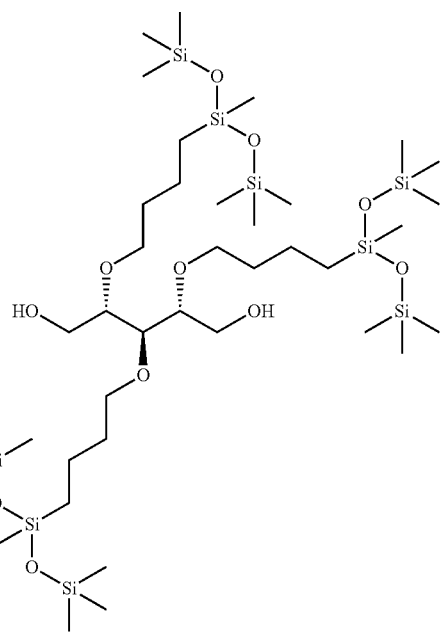
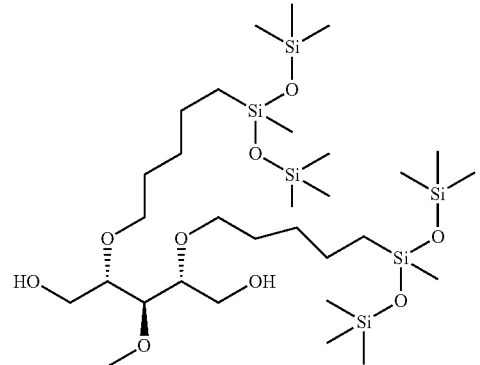

23
-continued
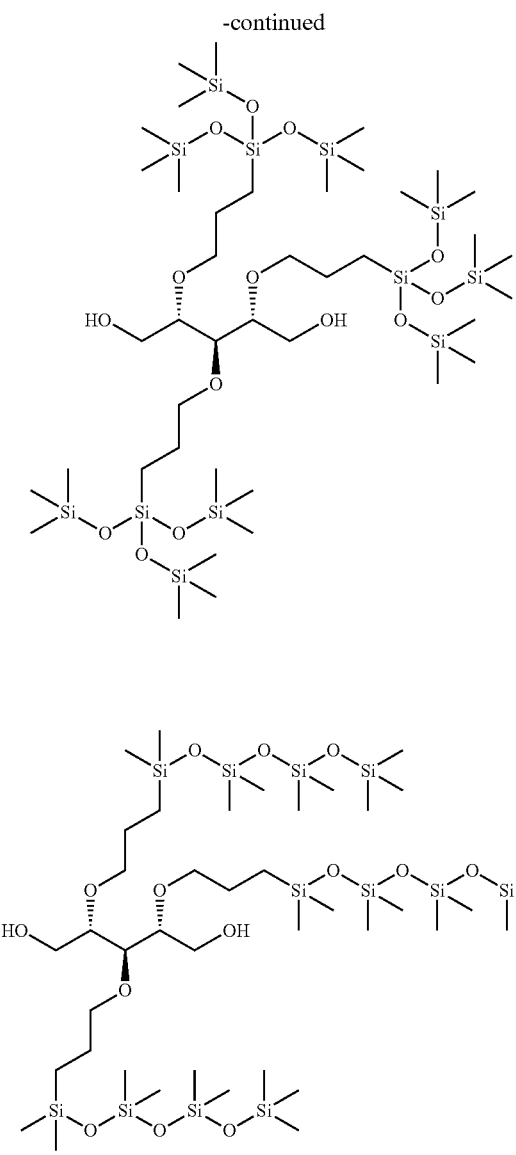
24
-continued
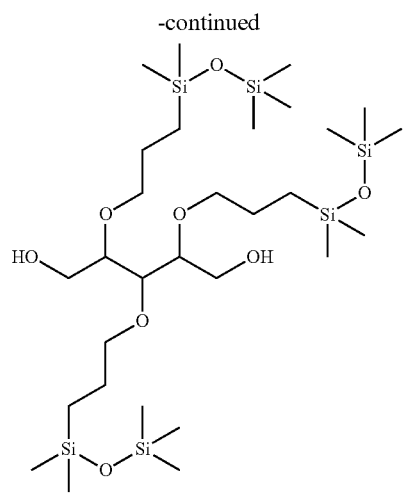
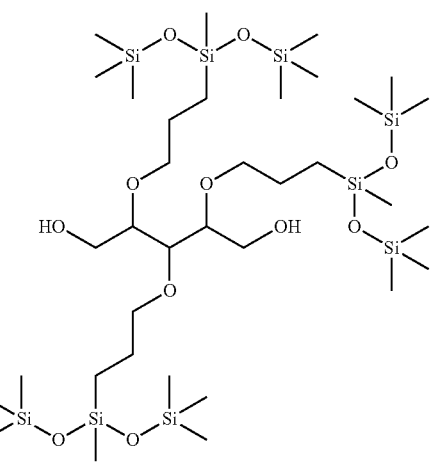
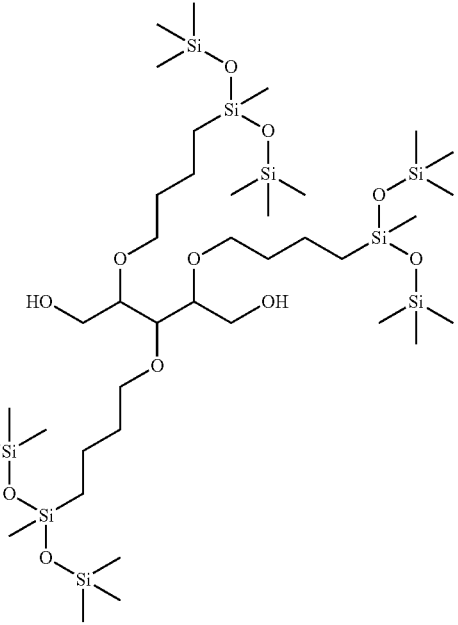

-continued
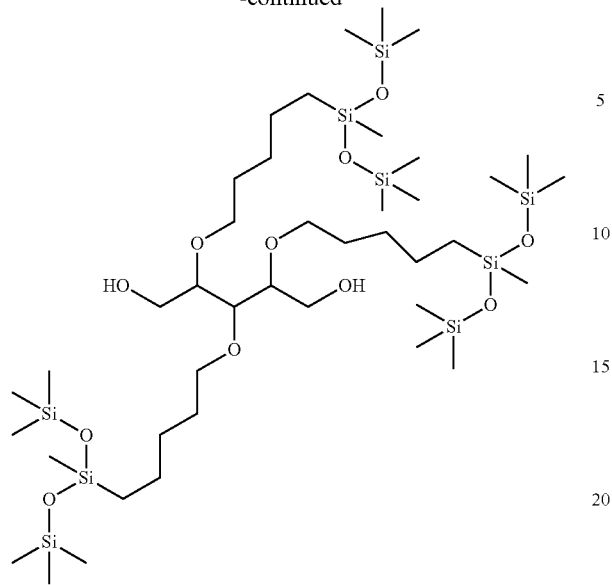
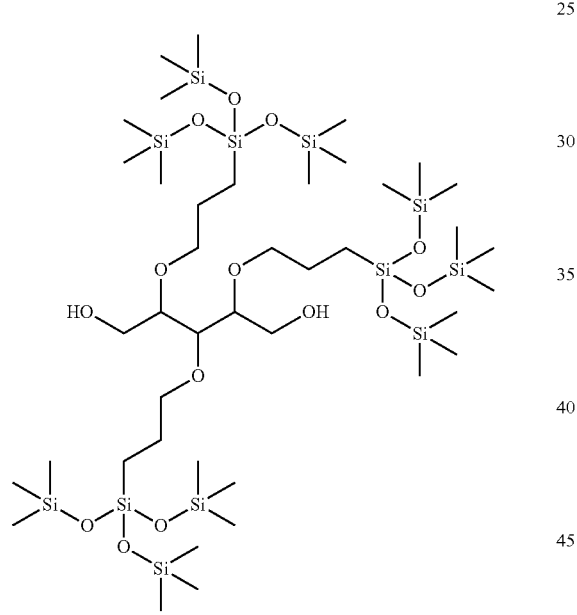
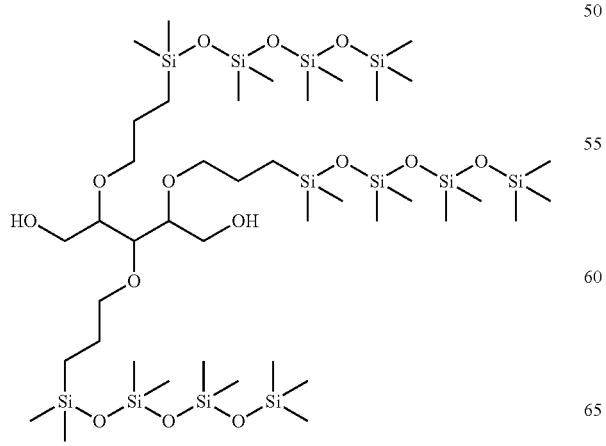
-continued
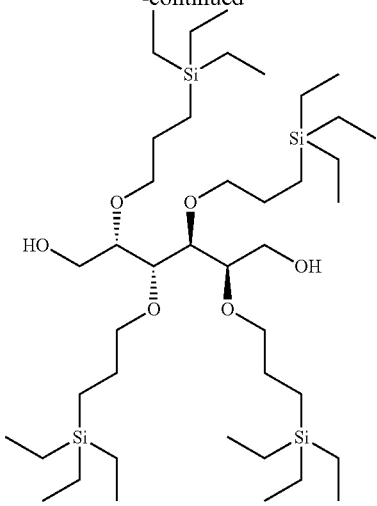
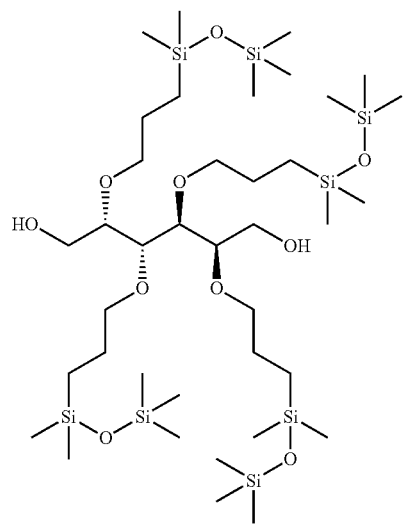
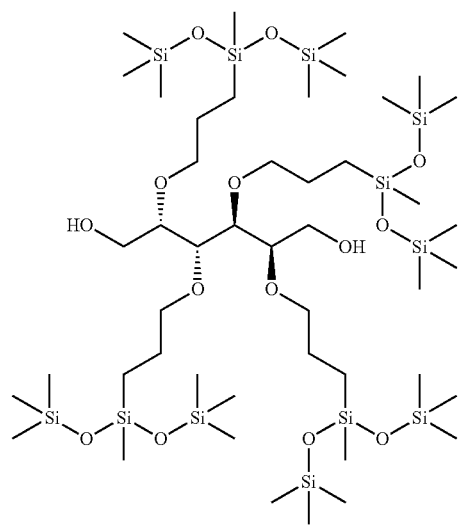

27
-continued
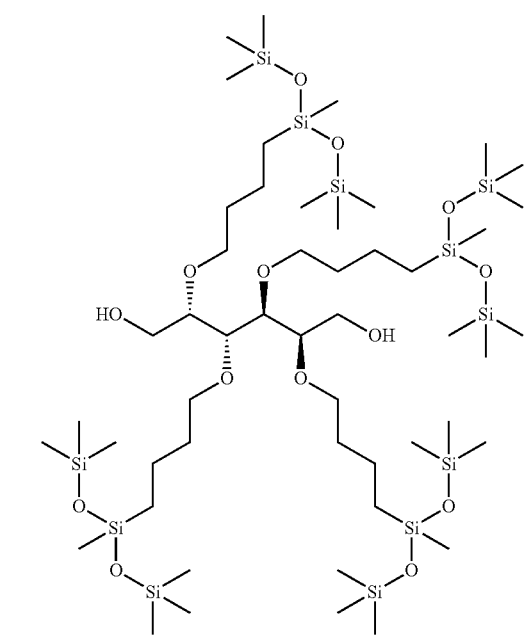
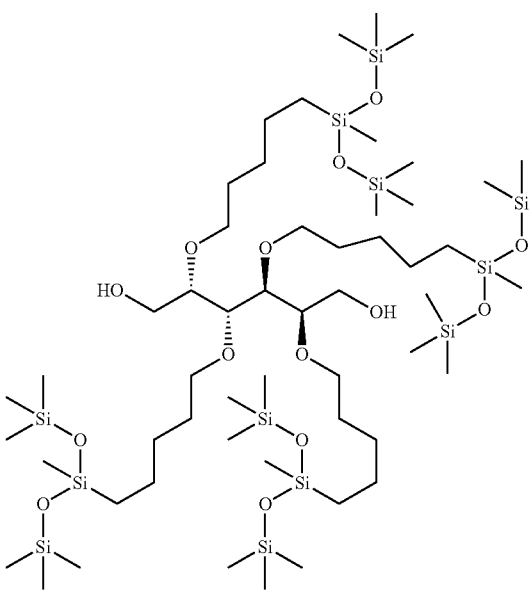
28
-continued
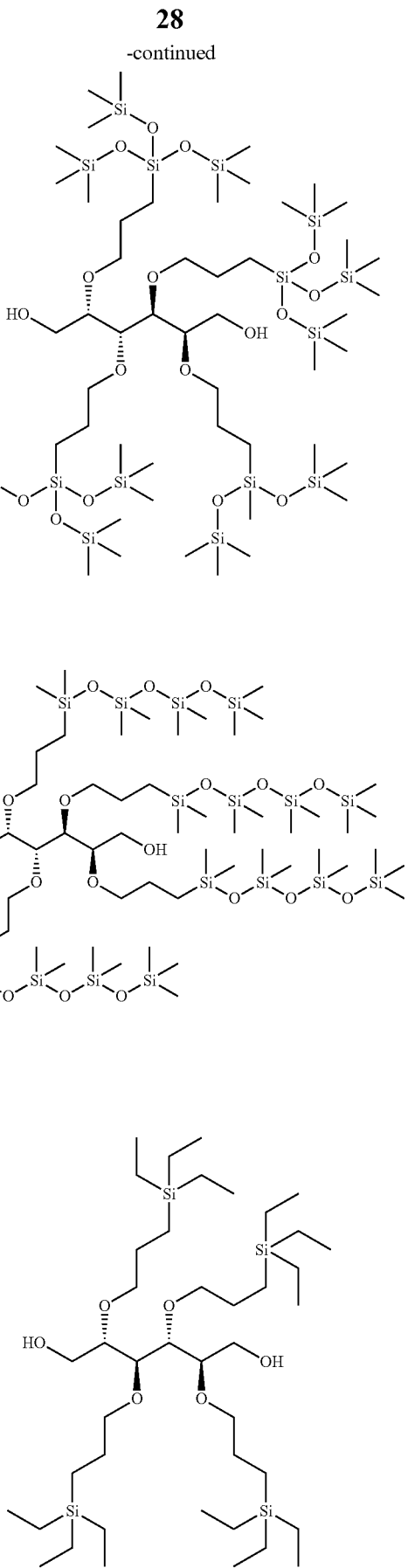

-continued
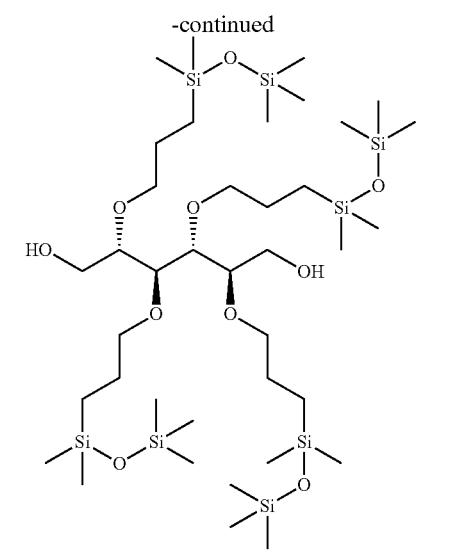
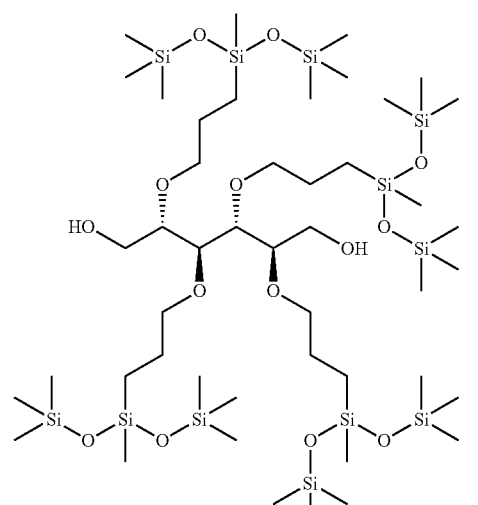
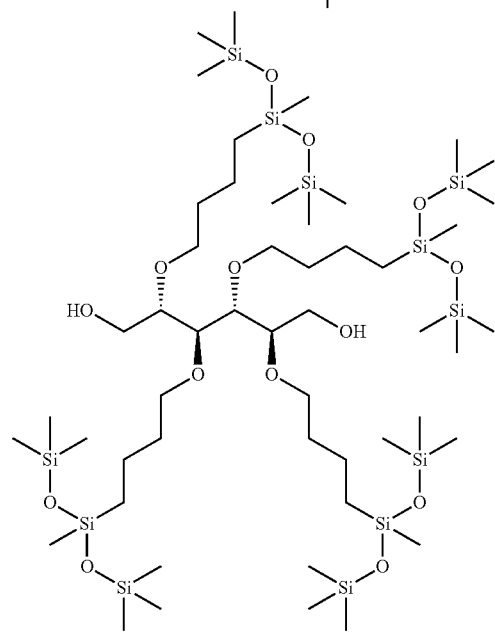
-continued
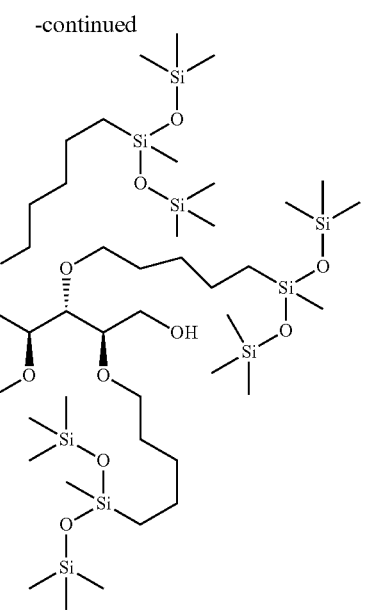
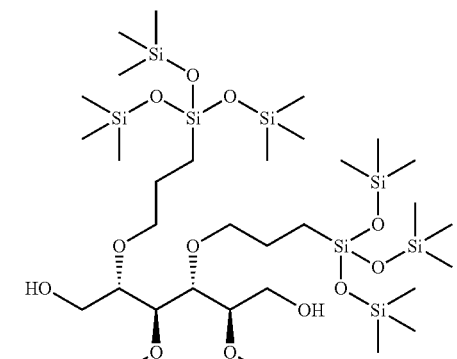
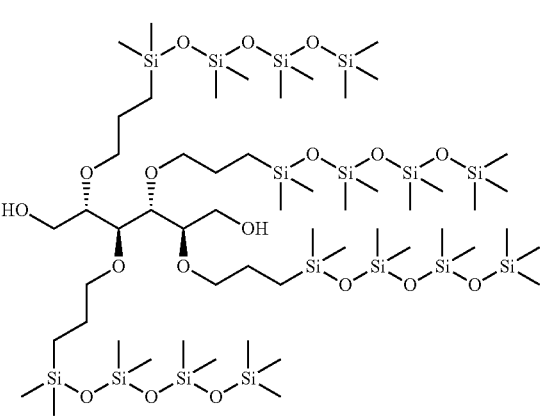

31
-continued
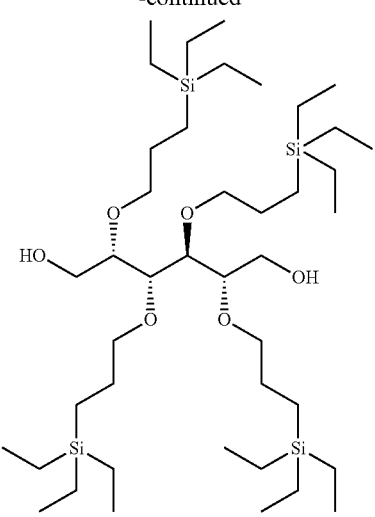
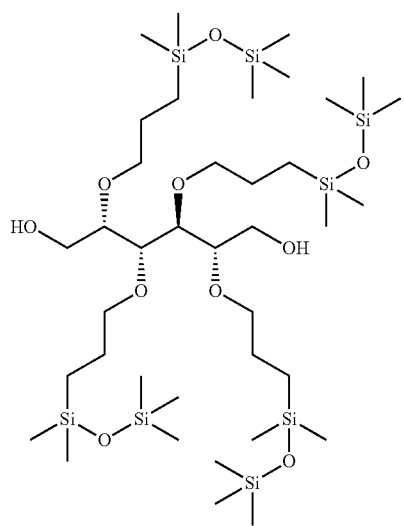
32
-continued
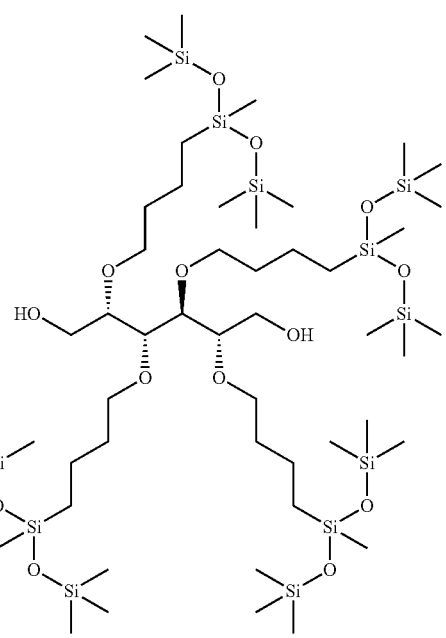
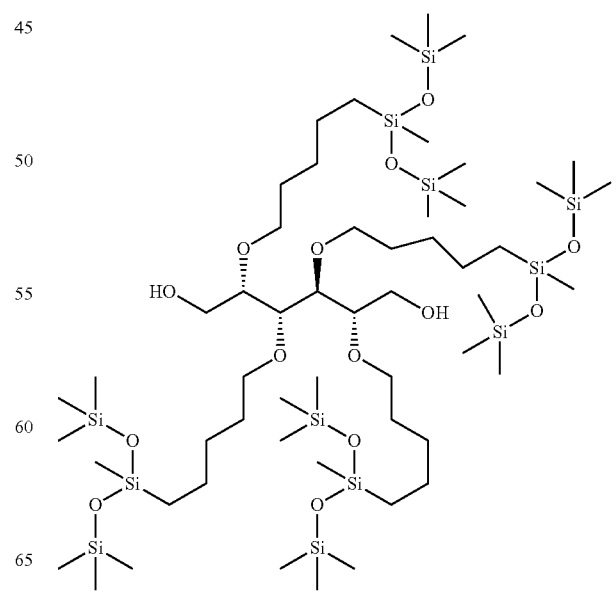

33
-continued
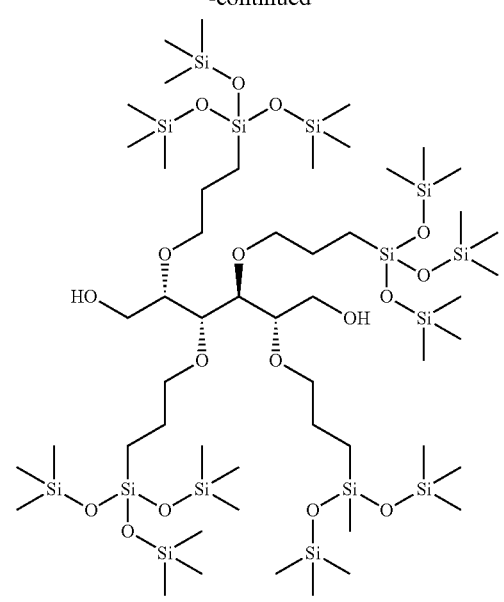
34
-continued
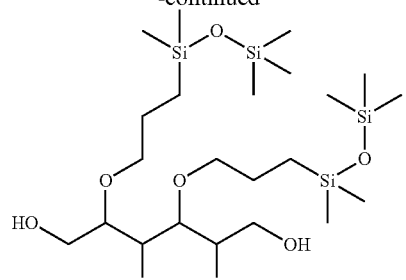
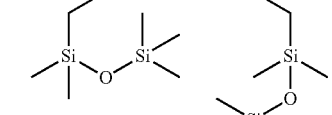
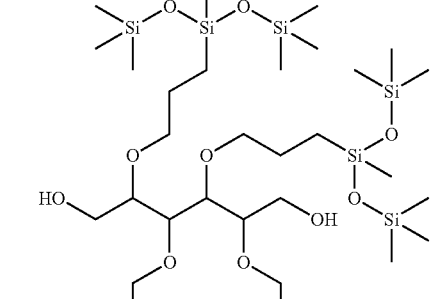
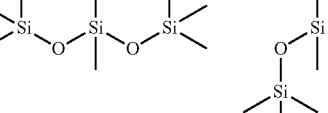
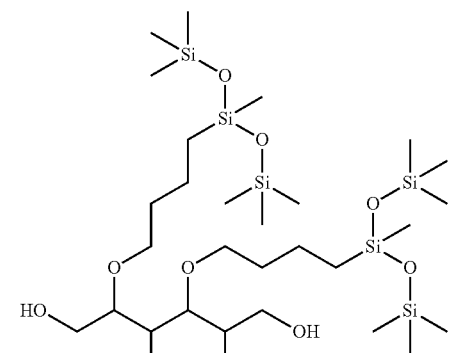
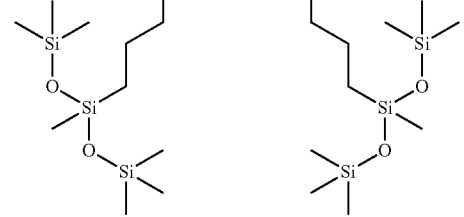

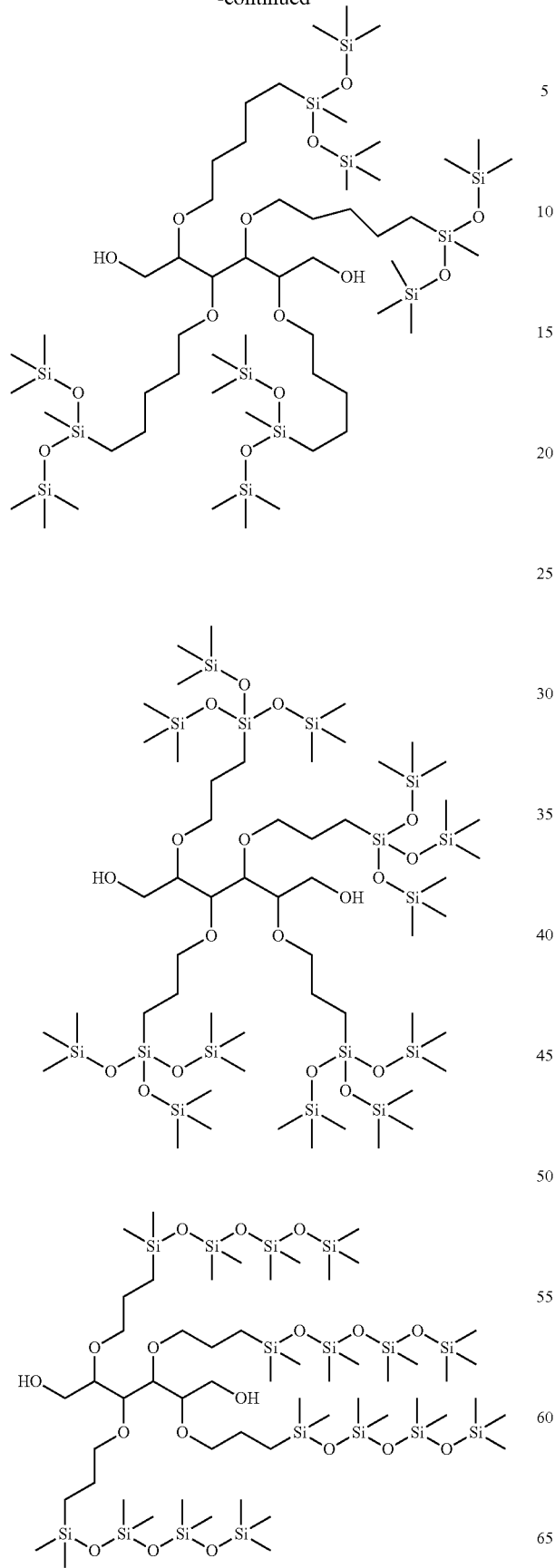
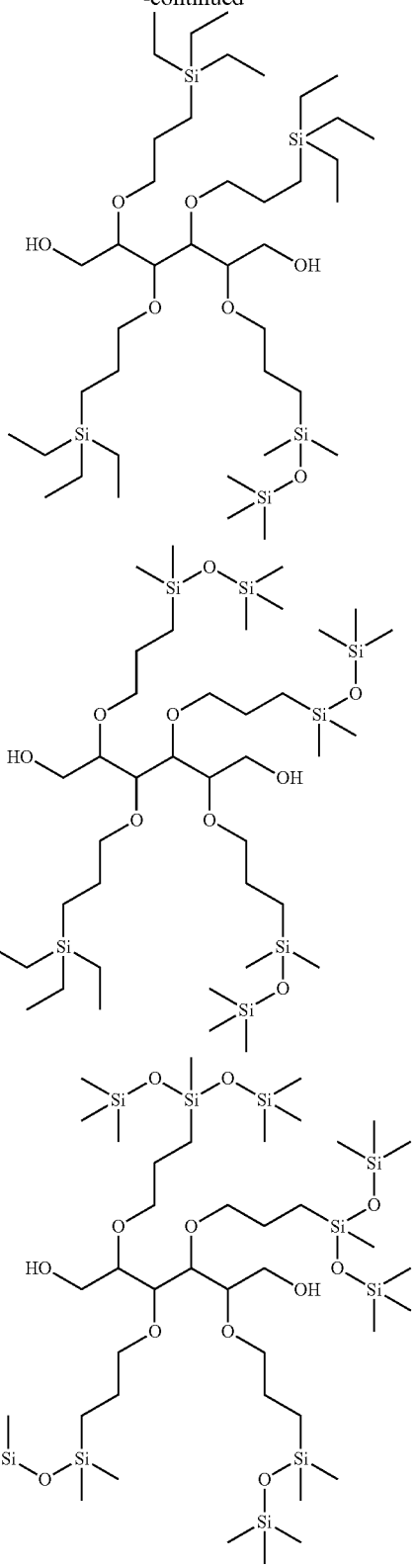
As the silicon-containing compound represented by the general formula (1), the shorter the chain length of the silicon-containing group, the less the decrease in strength when the stretchable film is formed. On the other hand, the longer the chain length of the silicon-containing group, the better the water repellency. When the silicon-containing group has a branched structure, water repellency can be improved with a short chain length. Therefore, the silicon-containing compound of the present invention is preferably a silicone compound represented by the following general formula (2),

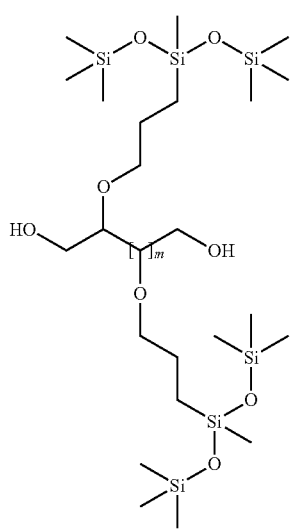

(2)

wherein, "m" is the same meaning as before.

Such a silicon-containing compound of the present invention is employed, by using it as a material of a urethane resin used for a stretchable film, it is possible to form a highly water repellent stretchable film having stretchability and strength comparable to those of the polyurethane, and having excellent water repellency on the surface of the film equal to or higher than that of the silicone in which the main chain is a siloxane bond.

<Urethane Resin (Urethane Polymer)>

The urethane resin of the present invention is a material having a structure represented by the following general formula (3),

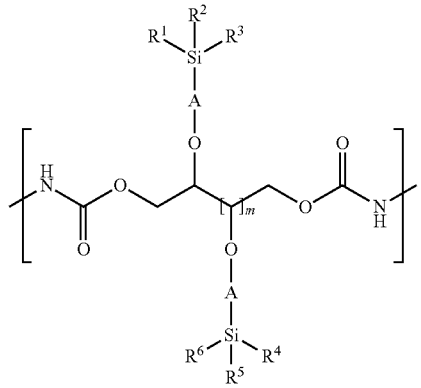

(3)

wherein, $R^1$ to $R^6$, A, and m represent the same meanings as before.

Specific examples of the urethane resin of the present invention are not particularly limited, and those similar to those mentioned in the specific examples of the above-mentioned silicon-containing compound can be applied as side chains containing a silicon-containing group.

The urethane resin preferably comprises a hard segment comprising a urethane bonding portion and a soft segment of chain length extending polyether, polyester, or polycarbonate portion. The strength is improved by hydrogen bonding between polymers of urethane bonds corresponding to the hard segment portion. It is said that hard segments form a crystallized structure by hydrogen bonding between polymers of urethane bonds.

The urethane resin of the present invention is characterized in that a plurality of groups having an ether group and a silicon atom are pendant as the side chain as shown in the general formula (3), and by presenting a silicon-containing group with high water repellency, a highly hydrophilic urethane bond is extruded to the opposite side of the silicon-containing group, and the localized electrons of the urethane bond are oriented to the outside. According to this situation, a stronger hydrogen bond is formed. When a silicone is introduced into the main chain, water repellency increases but strength lowers, and when the silicone is introduced into the side chain, not only water repellency but also strength is improved due to the above reason. Further, by providing a plurality of silicon-containing groups in the side chain, the effect can be remarkably enhanced.

In general, a film with high stretchability is soft, such a film with high stretchability and softness increases in tackiness as the film becomes thinner, and the films stick to each other making it difficult to separate. In the case of the stretchable film for the use of sticking to the skin, a thinner stretchable film is required to reduce the wearing feeling when it is stuck. By introducing the silicon-containing group, the adhesiveness and sticky feeling of the surface of the film are lowered, and a feeling of relief is obtained. Here, by providing a plurality of silicon-containing groups in the side chain, it is possible to further reduce the sticky feeling on the surface of the film. Since the strength of the film decreases as the film becomes thinner, in the urethane resin of the present invention, in order to increase the strength, the silicon-containing groups are introduced into a plurality of side chains instead of introducing into the main chain as mentioned above.

In addition, the urethane resin of the present invention is preferably a material having a structure which has a (meth) acrylate group at the terminal and represented by the following general formula (4),

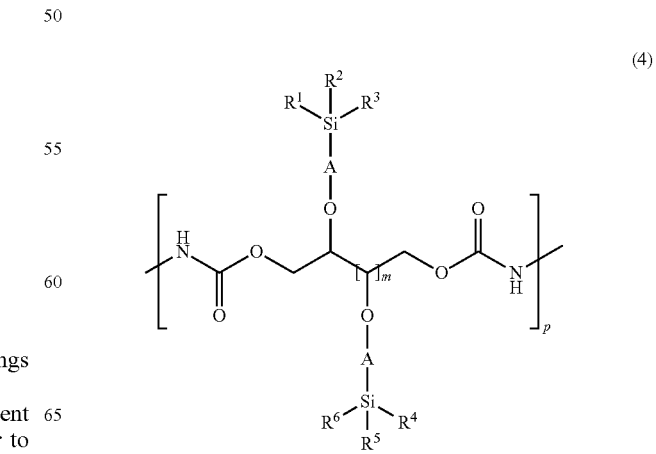

(4)

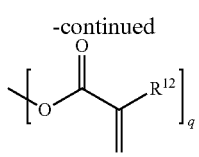

wherein, $R^1$ to $R^6$, and A are the same as defined above; $R^{12}$ represents a hydrogen atom or a methyl group; and "p", and "q" are numbers of units in one molecule and are integers in the range of $1 \leq p \leq 100$, and $1 \leq q \leq 3$.

[Method for Producing Urethane Resin]

The method of preparing the urethane resin of the present invention is not particularly limited, and it is preferable to use the above-mentioned silicon-containing compound of the present invention as a raw material, and to prepare the urethane resin by reacting the silicon-containing compound and a compound having an isocyanate group (isocyanate compound).

The isocyanate compound to be reacted with the silicon-containing compound of the present invention is not particularly limited, and the following may be specifically exemplified.

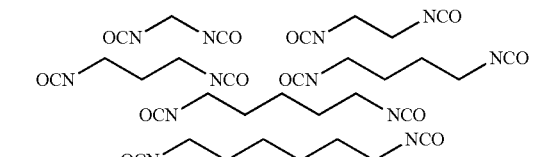
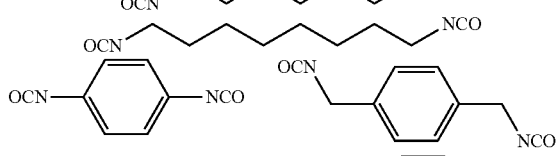
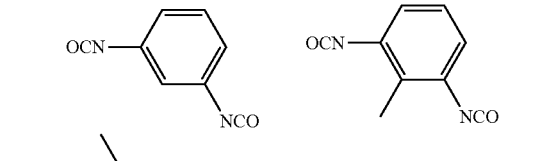
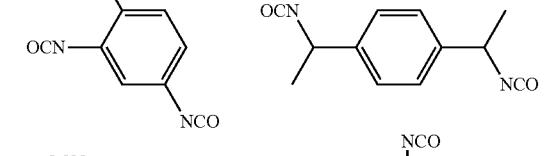
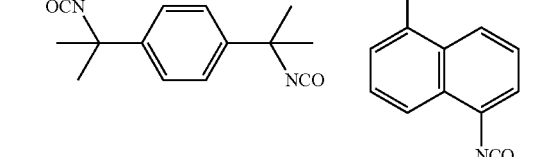
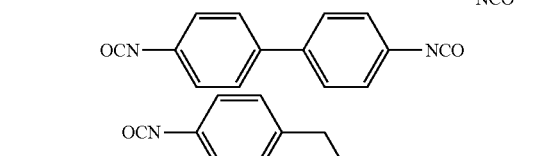
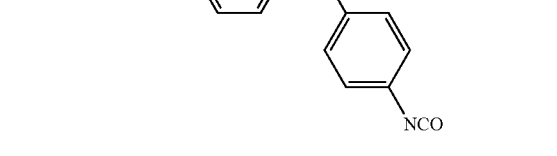

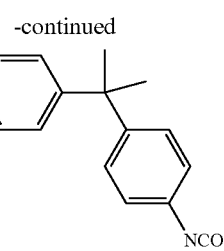
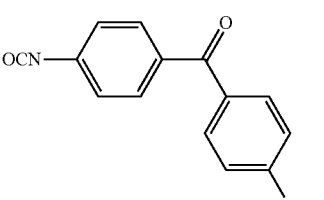
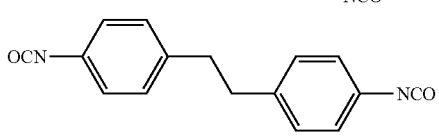
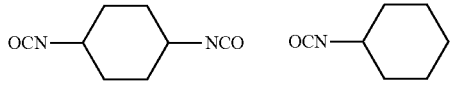
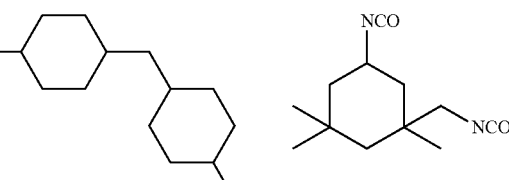
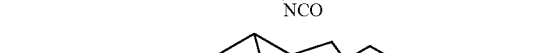
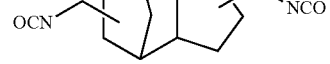
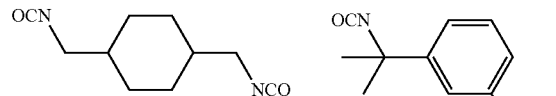
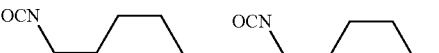
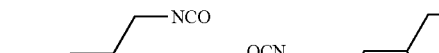

-continued
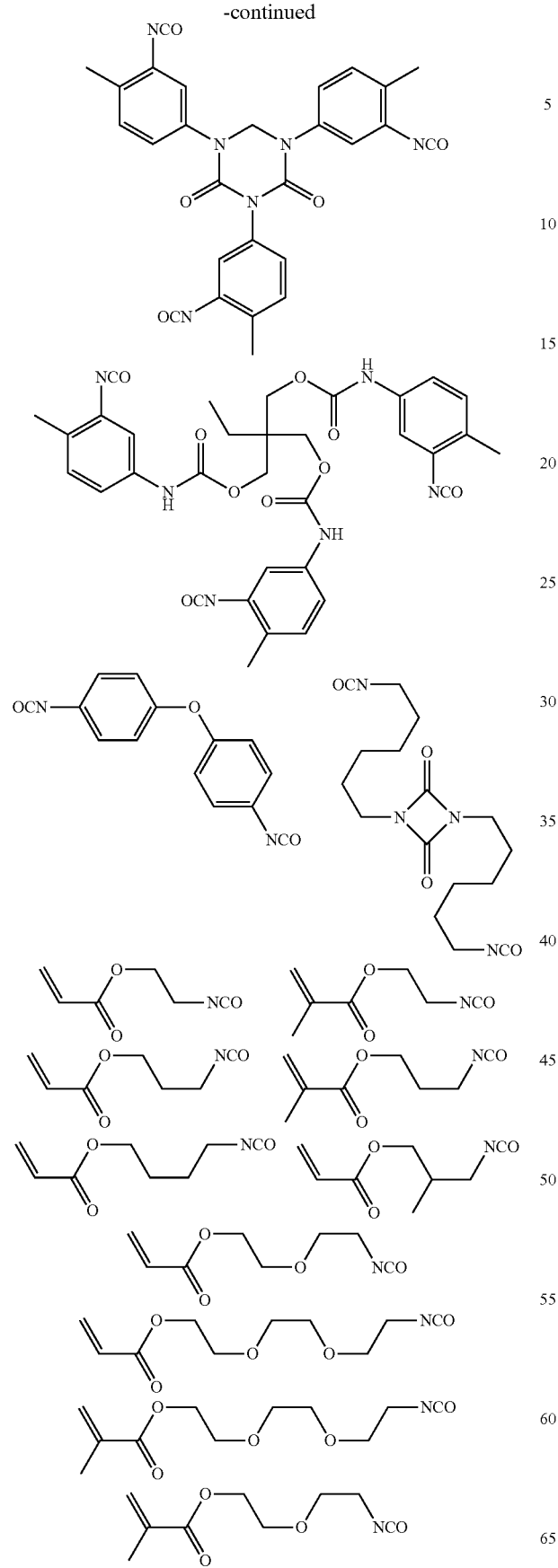
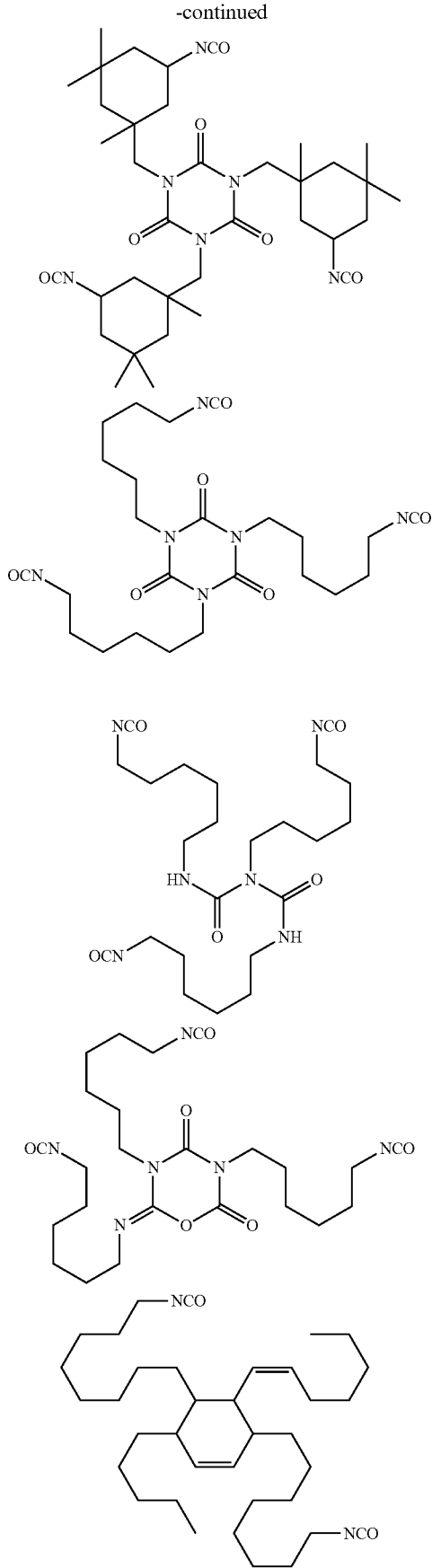

-continued

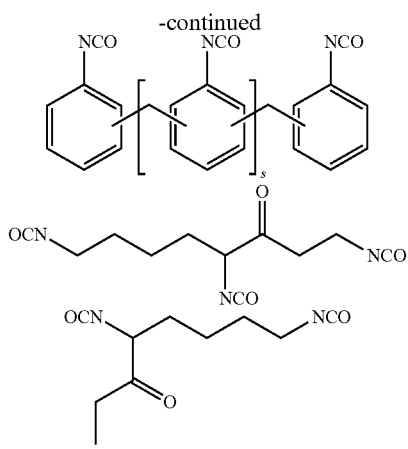

wherein, "s" is an integer of 1 or more.

Among the above isocyanate compounds, in particular, a compound having a (meth)acrylate group is reacted with the silicon-containing compound represented by the general formula (1) to obtain a urethane resin having a structure which has a (meth)acrylate group at the terminal represented by the general formula (4). A polymer having a structure which has a (meth)acrylate group at the terminal represented by the general formula (4) can be also obtained by reacting a material in which a compound having a (meth)acrylate group which has a hydroxyl group is reacted with an isocyanate compound, with the silicon-containing compound of the present invention.

As the isocyanate compound, it is preferable to use a compound having a blocked isocyanate group in which the isocyanate group has been protected by a substituent. According to this, even if the reactivity of the isocyanate compound with the silicon-containing compound represented by the above-mentioned formula (1) is high, the reaction can be easily controlled. Also, the isocyanate compound reacts with moisture in the atmosphere during storage and the isocyanate group is deactivated in some cases so that careful attention is required for storage such as sufficiently preventing humidity, but a compound having a blocked isocyanate group is used, it is possible to prevent these phenomena.

The blocked isocyanate group is a group in which the block group is deprotected by heating to form an isocyanate group, and specific examples thereof include an isocyanate group substituted by alcohols, phenols, thioalcohols, imines, ketimines, amines, lactams, pyrazoles, oximes, β-diketones and the like.

When a compound having a blocked isocyanate group is used, a catalyst may be added in order to lower the deprotection temperature of the blocked isocyanate group. The catalyst is not particularly limited, and organic tin such as dibutyltin dilaurate, a bismuth salt, zinc carboxylate such as zinc 2-ethylhexanoate and zinc acetate, and the like are known.

As disclosed in JP 2012-152725A, it is preferable to use zinc α,β-unsaturated carboxylic acid as a blocked isocyanate dissociation catalyst.

When the urethane resin of the present invention is to be prepared, in addition to the silicon-containing compound represented by the general formula (1) and the isocyanate compound, a compound having a plurality of hydroxyl groups can also be added. By adding such a compound having a plurality of hydroxyl groups, it is possible to perform chain length extension and intermolecular cross-linking of the urethane resin of the present invention.

The compound having a plurality of hydroxyl groups is not particularly limited, and specifically, the following compounds can be exemplified.

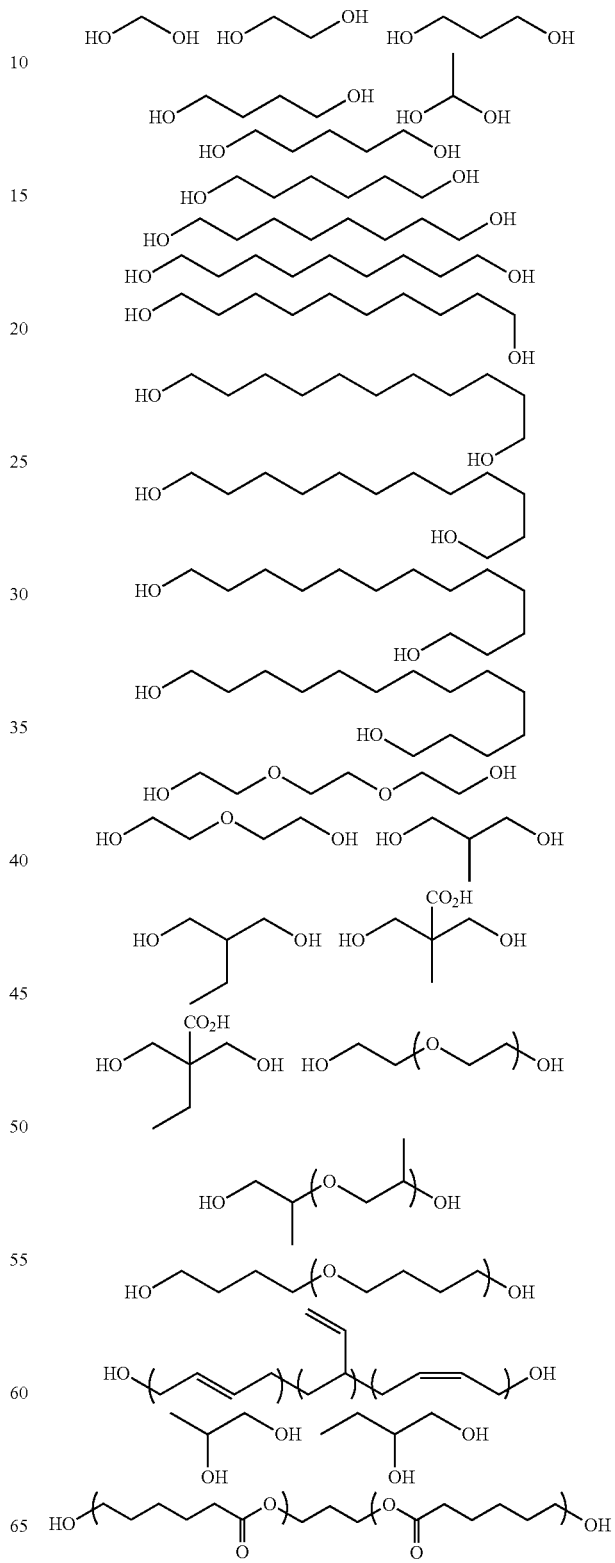

-continued
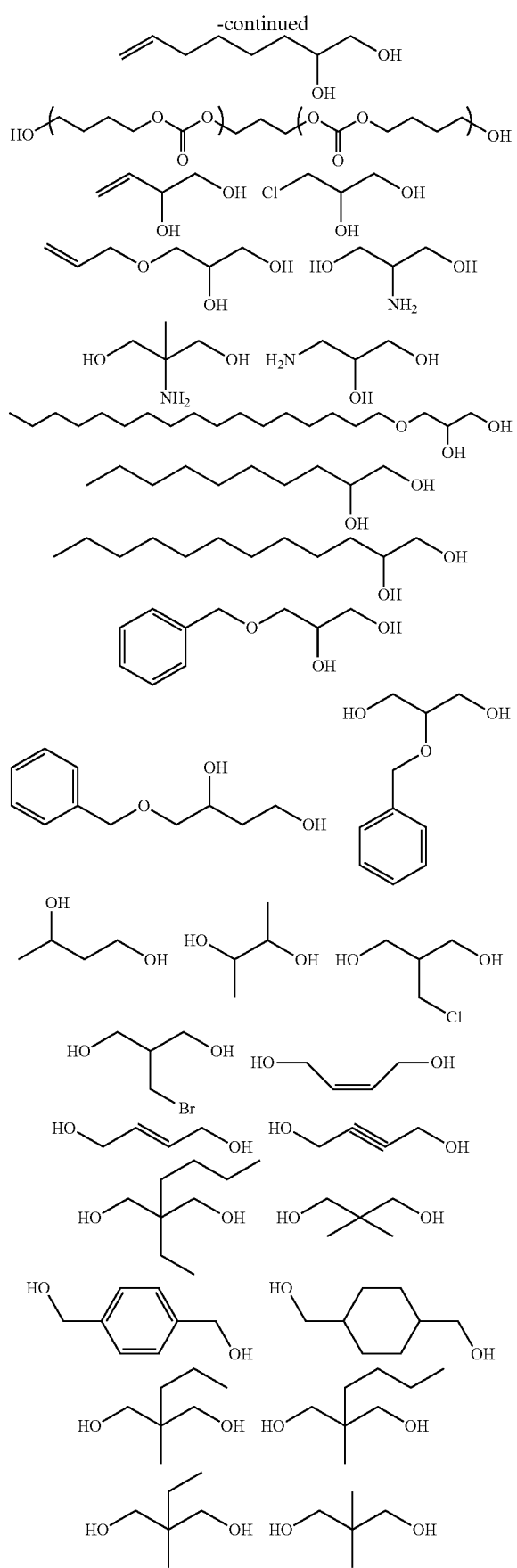
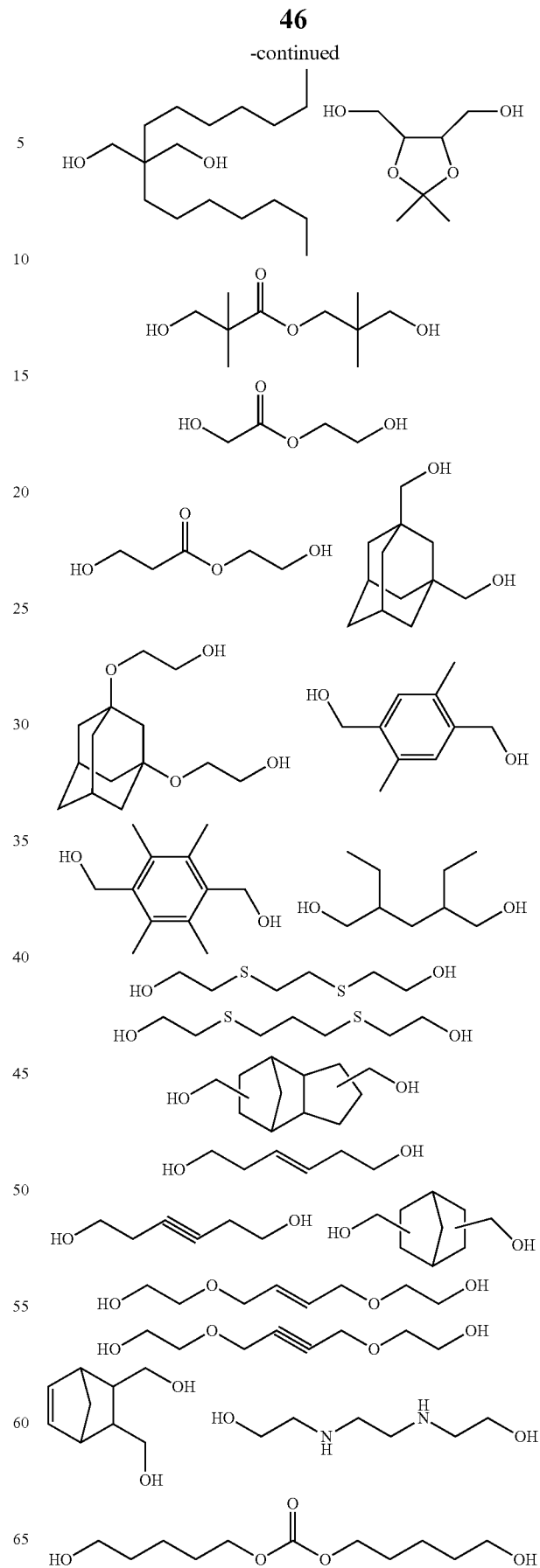

47
-continued
48
-continued
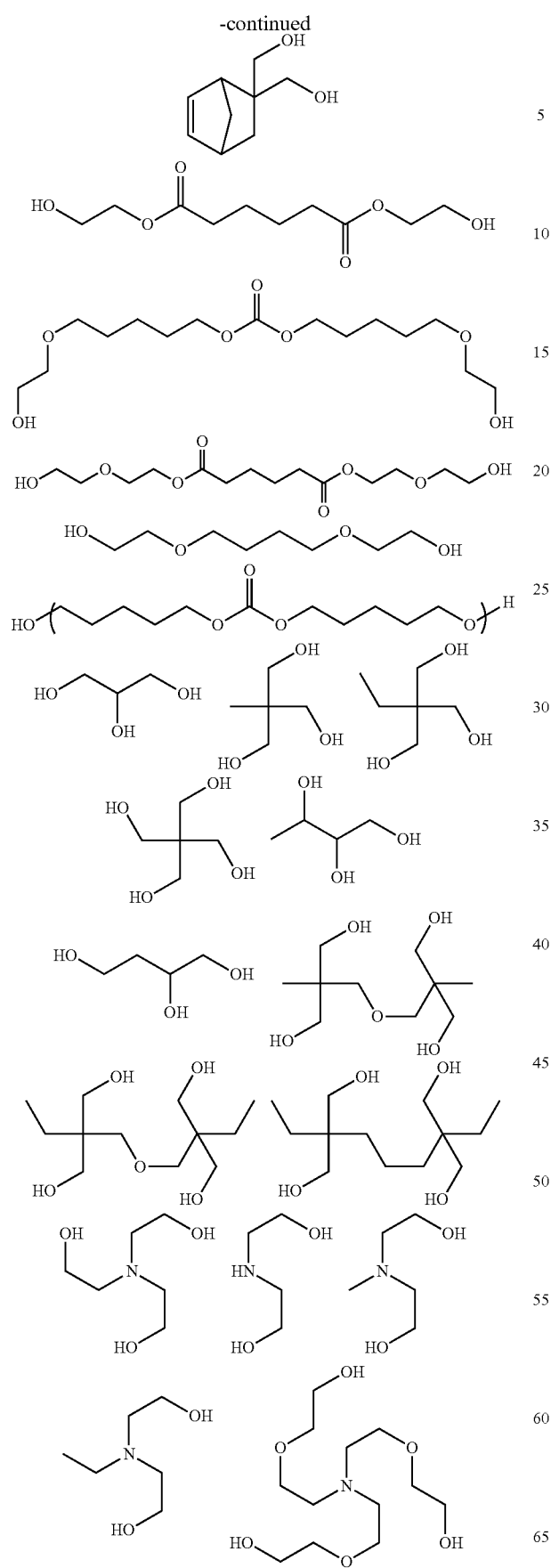
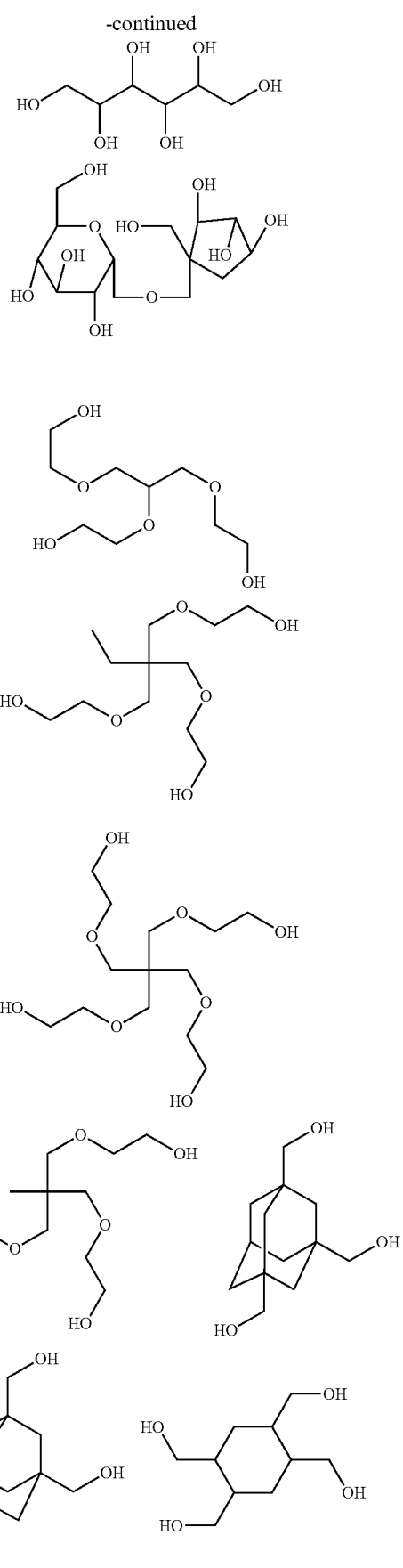
lp;2p

-continued

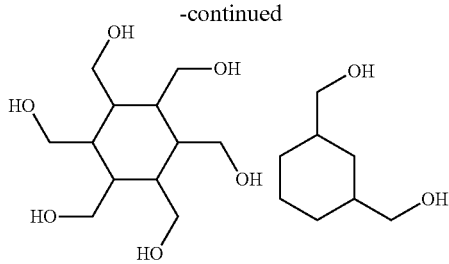

wherein, a repeating number of a repeating unit to which parentheses are attached is an arbitrary number.

A compound having an amino group can also be added. When an isocyanate group reacts with an amino group, a urea bond is formed. The portion of the urethane bond and the urea bond is called as hard segment, and strength increases by their hydrogen bonds. Therefore, it is possible to increase the strength not only by urethane bond but also by adding urea bond thereto.

The portion formed by a diol compound containing polyether, polyester, and polycarbonate for chain extension is called a soft segment. Among them, that having the highest stretchability is polyether, then stretchability decreases in the order of polyester and polycarbonate. On the other hand, the order of tensile strength is opposite to the order of stretchability. It is possible to adjust strength and stretchability by selecting a kind of the soft segment and a repeating unit.

The urethane resin of the present invention preferably has a weight average molecular weight of 500 or more. When it is such a material, it can be suitably used for the stretchable film of the present invention mentioned later. The upper limit value of the weight average molecular weight of the urethane resin is preferably 500,000 or less.

Such a urethane resin of the present invention is employed, it can be suitably used as a material of a highly water repellent stretchable film having excellent stretchability and strength equal to those of the polyurethane, and having excellent water repellency on the surface of the film which is the same as or better than that of the silicone the main chain of which is a siloxane bond.

<Stretchable Film>

In the present invention, a stretchable film containing the urethane resin of the present invention as mentioned above can be provided.

The stretchable film of the present invention is a cured product of the urethane resin of the present invention mentioned above, and the urethane resin has an ether group and a silicon-containing group in 2 to 4 side chains and has a urethane bond in the main chain.

The stretchable film of the present invention preferably has a stretching property of 40 to 500% in a tensile test specified in JIS K 6251. When such a stretching property is employed, it can be particularly suitably used as a coating film of stretchable wiring.

In addition, it is preferable that the stretchable film of the present invention is used as a film which is in contact with a conductive wiring having stretchability. The stretchable film of the present invention can be particularly suitably used for such applications.

When the stretchable film of the present invention as explained above is employed, it becomes a stretchable film having excellent stretchability and strength comparable to those of the polyurethane, and having excellent water repellency on the surface of the film which is the same as that of the silicone.

<Method for Forming Stretchable Film>

In the present invention, there is provided a method for forming a stretchable film, which method comprises
mixing a silicon-containing compound represented by the following general formula (1) and a compound having an isocyanate group(s), forming a film of the mixture, and curing by heating,

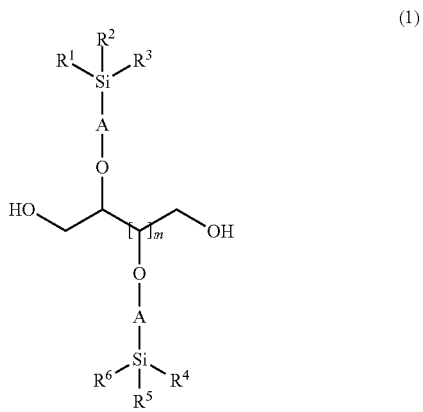

(1)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

As an example of such a method of forming a stretchable film, there may be mentioned, for example, a method in which a silicon-containing compound represented by the general formula (1) is mixed with a protected or unprotected isocyanate compound and a compound having a plurality of hydroxyl groups for chain elongation or crosslinking, and if necessary, a compound having an amino group, and the mixture is coated onto a substrate for peeling to form a film, and the film is cured by heating.

In this method, a polymer network is formed by reacting an isocyanate with an alcohol to increase the molecular weight while forming a urethane bond. When a compound having three or more hydroxyl groups or isocyanate groups is added, the crosslinking reaction proceeds, so that the stretchability decreases but the film strength increases. Therefore, hardness, stretchability and strength can be adjusted by adjusting a blending amount of the compound having two or three hydroxyl groups or isocyanate groups. In addition, by peeling the film from the substrate after curing, an independent stretchable film can be obtained.

A ratio of the number of moles of the hydroxyl group to the number of moles of the isocyanate group in the composition for forming a stretchable film is preferably such that the number of moles of the hydroxyl group and the isocyanate group is the same number of moles or the number of the hydroxyl groups is larger, that is, the numerical value obtained by dividing the number of moles of the hydroxyl group by the number of moles of the isocyanate group is 1 or more. If the number of the isocyanate groups is smaller, there is no possibility of generating a carbon dioxide gas by reacting excessive isocyanate groups with water, so that there is no fear of generating holes due to foaming in the film. When urethane foam is to be prepared, the isocyanate group is made excessive, but in the stretchable film of the present invention, it is preferable that there is no hole due to foaming in the film since the characteristics of high strength are required.

When the resin in the stretchable film of the present invention is formed in a state where the number of moles of the hydroxyl group is larger than the number of the moles of the isocyanate group as mentioned above, at the polymer terminal, a urethane bond is formed only at one side of the silicon-containing compound represented by the general formula (1), and a portion that does not have a structure in which a urethane bond is formed on both sides as in the structure represented by the general formula (3) may occur in some cases. In this case, the terminal of the polymer has a structure represented by the following general formula (3'),

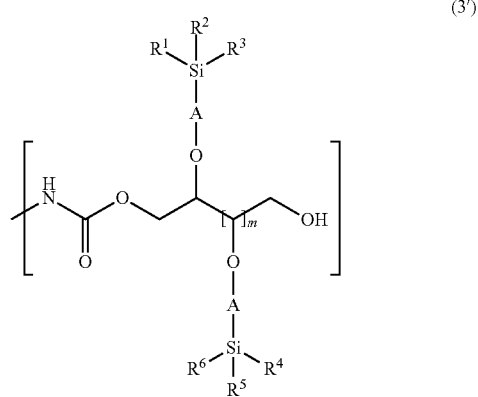

(3')

wherein, $R^1$ to $R^6$, "m", and A represent the same meanings as before.

In the method for forming the stretchable film of the present invention, as a heating temperature for curing the film-formed composition, a temperature in the range of room temperature to 200° C. is used. It is preferably in the range of 40 to 160° C., and a time is in the range of 5 seconds to 60 minutes. When the film is cured by heating, there are cases where one side of the film-formed composition is covered with a release film and both sides of the film-formed composition are covered. In the case of curing while winding with a roll, it is preferable to use one side, and in the case of curing by sheet-feeding, both sides are preferred, but this is not limited.

In addition, in the present invention, there is provided a method for forming a stretchable film, which comprises forming a film of a compound having a (meth)acrylate group at the terminal represented by the following general formula (4), and curing by heating and/or irradiating light,

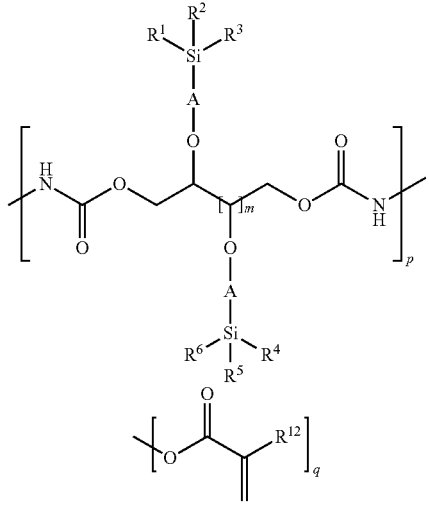

(4)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; $R^{12}$ represents a hydrogen atom or a methyl group; "m" is an integer in the range of 1 to 3; and "p" and "q" are numbers of units in one molecule and are integers in the range of $1 \le p \le 100$, and $1 \le q \le 3$.

As an example of a method of forming such a stretchable film, for example, there may be mentioned a method in which a urethane polymer is synthesized by the reaction of an isocyanate and an alcohol, a (meth)acrylate group is formed at the terminal represented by the general formula (4), forming a film of the polymer and curing the same by heating and/or irradiating light to form a stretchable film. Specifically, it is a method for forming a stretchable film which comprises mixing the silicon-containing compound represented by the general formula (1) with a protected or unprotected isocyanate compound and a compound having a plurality of hydroxyl groups which is for chain extension or crosslinking, polymerizing the mixed materials, and forming a strechable film using a urethane polymer the polymer terminals of which are made (meth)acrylates. In this case, the (meth)acrylate is reacted with a radical to carry out crosslinking. As a method of radical crosslinking, addition of a radical generator is desirable. As the radical generator, there are a thermal radical generator that generates radicals by thermal decomposition, and a photo-radical generator that generates radicals by light irradiation.

The thermal radical generator is not particularly limited, and include, for example, azo radical generators and peroxide radical generators. Examples of the azo radical generators include 2,2'-azobisisobutyronitrile (AIBN), 2,2'-azobis (2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), 4,4'-azobis(4-cyanovaleric acid) and the like. Examples of peroxide radical generators include benzoyl peroxide, decanoyl peroxide, lauroyl peroxide, succinic acid peroxide, t-butyl peroxy-2-ethylhexanoate, t-butyl peroxypivaloate, 1,1,3,3-tetramethylbutylperoxy-2-ethylhexanoate and the like.

The photo-radical generator is not particularly limited, and include, for example, acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methyl propiophenone, 2-isonitrosopropiophenone, 2-phenyl-2-(p-toluenesulfonyloxy)acetophenone (BAPO), and camphor quinone.

An amount of the thermal or photo-radical generator to be blended is preferably in the range of 0.1 to 50 parts by mass with respect to 100 parts by mass of the resin.

In addition, a crosslinking agent having a plurality of (meth)acrylates or thiols can also be added. According to this procedure, efficiency of radical crosslinking can be improved.

A monomer having an alkyl group or an aryl group, or a monomer having a silicon-containing group or a fluorine-substituted alkyl group or aryl group can be also added. According to this procedure, viscosity of the solution can be lowered and a thinner stretchable film can be formed. If these monomers have a polymerizable double bond, they are immobilized in the film during curing of the film.

The monomer having an alkyl group or an aryl group is not particularly limited, and it can be mentioned isobornyl acrylate, lauryl acrylate, tetradecyl acrylate, stearyl acrylate, isostearyl acrylate, behenyl acrylate, adamantane acrylate, phenoxyethylene glycol acrylate, and phenoxydiethylene glycol acrylate.

When a stretchable film is formed by using a compound having a (meth)acrylate group at the terminal, it is also possible to cure by combining thermal curing and photocuring. For example, the stretchable film which becomes a base is formed by thermal curing, and the stretchable film thereon may be formed by photocuring. The merit of photocuring is that heating is not necessarily required and that curing can be performed in a short time. For curing of a portion that does not reach light, it may be formed by thermal curing. By combining thermal curing and photocuring, it is possible to select a curing method that makes the most of each advantage.

For forming the stretchable film, there may be mentioned a method in which the composition is coated onto a flat substrate or a roll. The method for applying the composition is not particularly limited, and examples thereof include spin coating, bar coating, roll coating, flow coating, dip coating, spray coating, doctor coating and the like. It is also preferable to apply the coating so that the coating thickness is 1 μm to 2 mm.

For sealing the parts having irregularities, it is preferable to use a method such as roll coating or spray coating, or a method of coating only a necessary portion by screen printing or the like. In order to carry out various coatings and printing, it is necessary to adjust the viscosity of the mixed solution. In the case of lowering the viscosity, an organic solvent is mixed. In the case of making it high viscosity, filler such as silica or the like is mixed.

As the organic solvent, an organic solvent having a boiling point at atmospheric pressure in the range of 115 to 200° C. is preferable. Specifically, one or more kinds selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate is preferably used.

When a compound having a (meth)acrylate group at the terminal is cured by heating, thermal curing can be carried out, for example, on a hot plate, in an oven, or by irradiation with far infrared rays. The heating condition is preferably 30 to 150° C. for 10 seconds to 60 minutes, and more preferably 50 to 120° C. for 30 seconds to 20 minutes. The bake environment may be in air, inert gas or vacuum.

When a compound having a (meth)acrylate group at the terminal is cured by irradiating light, curing by photo irradiation is preferably carried out with light having a wavelength of 200 to 500 nm. As the light source, for example, a halogen lamp, a xenon lamp, an excimer laser, LED, or the like can be used. Further, it may be irradiation with an electron beam. The irradiation dose is preferably in the range of 1 mJ/cm$^2$ to 100 J/cm$^2$.

The urethane resin having a urethane bond represented by the general formula (3) of the present invention can be used not only for forming a stretchable film but also as a fiber using the same. After fiberizing it, it can also be knitted into stretchable cloth or nonwoven fabric. Alternatively, polyester or cotton can be coated with the urethane resin of the present invention, so that cloth or nonwoven fabric can be obtained thereby.

Further, the urethane resin having a urethane bond represented by the general formula (3) can be made a urethane gel. By lowering the crosslinking density, a gel with high water repellency, high elasticity and low hardness can be formed. The feeling of a soft gel is a pleasant feel, and has the ability to repel sweat and water.

Here, in FIGS. 1 to 9, examples of the use of the stretchable film of the present invention are shown. FIG. 1 is a cross-sectional view showing an electrocardiograph covered with a stretchable film of the present invention, FIG. 2 is a schematic view of the electrocardiograph of FIG. 1 as seen from the bioelectrode side. FIG. 3 is a cross-sectional view showing the electrocardiograph 1 in a state before being covered with the stretchable film of the present invention, FIG. 4 is a schematic view of the electrocardiograph 1 of FIG. 3 as seen from the side of the bioelectrode, and the electrocardiograph 1 of FIGS. 3 and 4 is the one disclosed in the Patent Document 1. As shown in FIGS. 3 and 4, in the electrocardiograph 1, three bioelectrodes 2 are linked with a wiring 3 through which electric signals pass and connected to a center device 4.

As the material of the wiring 3, a conductive material including a metal such as gold, silver, platinum, titanium, stainless steel or the like, or carbon or the like is generally used. In order to obtain stretchability, it is also possible to adopt a bellows-shaped wiring as disclosed in Patent Document 1, or the wiring may be formed by pasting powder of the above conductive material or the wired conductive material on the stretchable film, by printing a conductive ink containing the above conductive material or using a conductive cloth in which a conductive material and a fiber are combined.

The electrocardiograph 1 needs to be pasted to the skin, so that in the electrocardiograph 1 of FIGS. 3 and 4, an adhesive portion 5 is arranged around the bioelectrode 2 in order to prevent the bioelectrode 2 from leaving the skin. When the bioelectrode 2 is a material having adhesiveness, the adhesive portion 5 in the vicinity is not necessarily required.

The electrocardiograph 1 is, as shown in FIG. 1, covered with the stretchable film 6 which is the stretchable film of the present invention. However, as shown in FIG. 2, since the bioelectrode 2 and the adhesive portion 5 need to be adhered to the skin, they are not covered with the stretchable film 6.

When the electrocardiograph 1 is covered with the stretchable film 6, it is possible to cover the front and back of the electrocardiograph 1 simultaneously, but it is also possible to cover one side at a time. In the case where the bioelectrode 2 and the adhesive portion 5 which are in contact with the skin are not covered, for example, as shown in FIG. 5, the electrocardiograph 1 covered with the stretchable film 6 as shown in FIG. 1 can be also obtained by placing the electrocardiograph 1 so as to bring the adhesive portion 5 into contact with the substrate 7 having releasability and covering it by a stretchable film material, curing it by light or heat to form a stretchable film 6, and then, peeling from the substrate 7.

In addition, as shown in FIG. 6, there may be mentioned a method in which the bioelectrode 2, the adhesive portion 5 and the wiring 3 are formed on the stretchable film 6, the center device 4 is connected, and a stretchable film material is coated thereon and cured as shown in FIG. 7 to form a stretchable film 6'. In this case, the bioelectrode 2, the adhesive portion 5 and the wiring 3 may be formed on the stretchable film 6 formed on the substrate 7 having releasability.

Further, as shown in FIG. 8, the stretchable film 6 is formed on the cloth 8, the bioelectrode 2 and the wiring 3 are formed thereon and connected to the center device 4, and the stretchable film 6' is formed thereon as shown in FIG. 9 so as to cover the wiring 3 and the center device 4.

As shown in FIGS. 5, 7, and 9, when the stretchable films 6, and 6' are formed on parts with irregularities, as mentioned above, it is preferable to use a method such as roll coating and spray coating, or a method in which coating is carried out only on the necessary portion by screen printing and the like.

Also, as shown in FIGS. 6 to 9, when the stretchable film 6' is formed on the stretchable film 6, if the compound represented by the general formula (3) is used, the stretchable film 6 is formed by thermosetting, and the stretchable film 6' thereon can also be formed by photocuring.

According to the method for forming a stretchable film of the present invention as explained above, it is possible to easily form a stretchable film having excellent stretchability and strength equal to or higher than those of the polyurethane, and having high water repellency on the surface of the film.

EXAMPLE

Hereinafter, the present invention will be concretely explained by using Examples and Comparative examples, but the present invention is not limited thereto. The weight average molecular weight (Mw) is a weight average molecular weight in terms of polystyrene measured by GPC.

[Synthesis of Silicone Pendant Diol Compound 1]

The reaction shown in the reaction formula described in the following formula (5) was carried out.

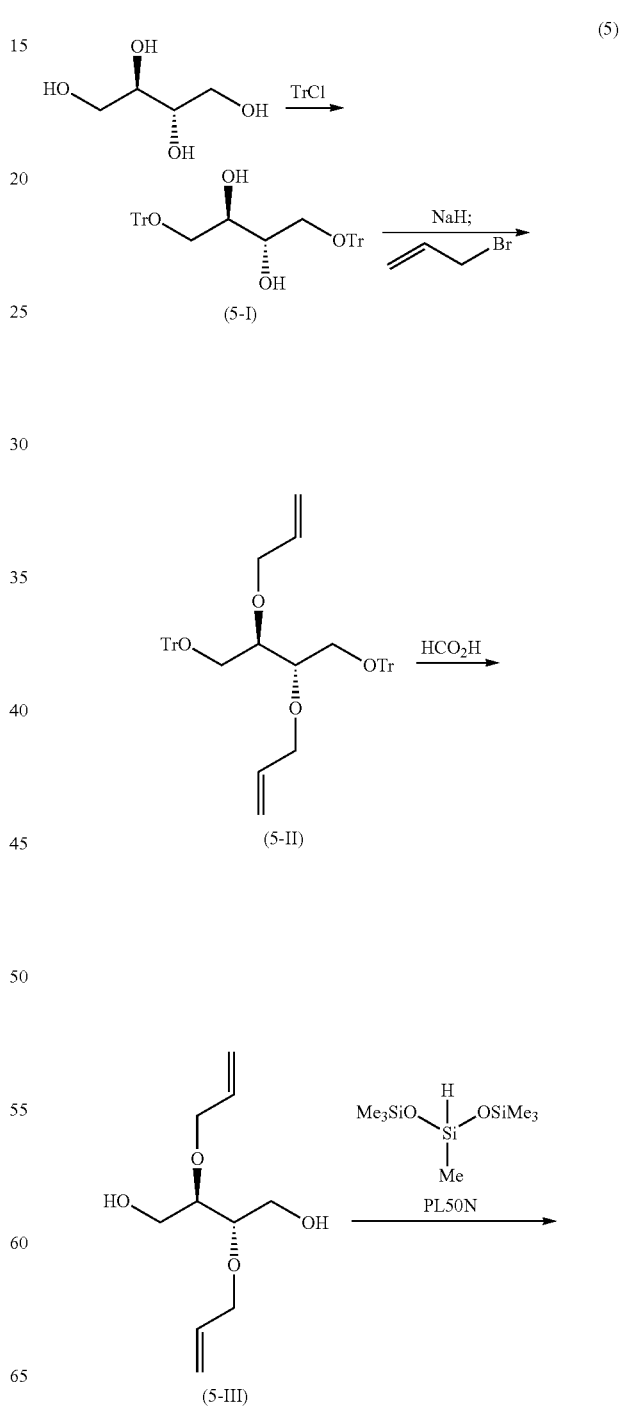

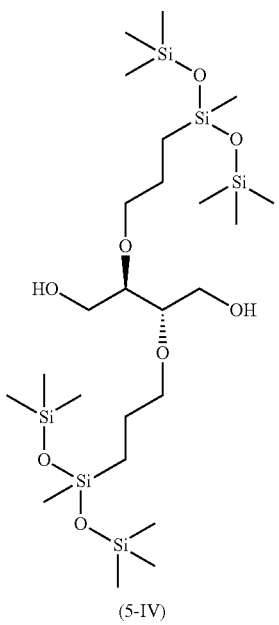

(5-IV)

(Synthesis of Diol (5-I))

In a 1 L two-necked flask were charged 50 g of meso-erythritol, 500 g of DMF, 104 g of triethylamine and 0.5 g of N,N-dimethylaminopyridine, and the mixture was stirred at room temperature under a nitrogen atmosphere. Subsequently, trityl chloride was added under ice-cooling, and the mixture was stirred at room temperature for 3 hours. The reaction mixture was transferred to a 2 L beaker, 1 L of water was added thereto and stirred, and the precipitate was collected by a Buchner funnel. The obtained powder was returned to a 2 L beaker, washed three times with 500 mL of ethyl acetate and 500 mL of hexane, and then vacuum-dried to obtain 207 g of a diol (5-I) having the following properties.

Diol (5-I)

Yellowish-white powder $^1$H-NMR (500 MHz, DMSO-$d_6$): δ=7.45-7.10 (30H, m), 4.75 (2H, s), 3.66-3.61 (2H, m), 3.00-2.93 (4H, m)

(Synthesis of Diallyl Compound (5-II))

In a 2 L two-necked flask were charged 100 g of the diol (5-I) and 700 g of DMF, the mixture was stirred and dissolved at 40° C. under nitrogen atmosphere, and the solution was cooled using an ice bath. Subsequently, 24 g of sodium hydride was added and after stirring for 2 hours, 44 g of allyl bromide was added dropwise. After stirring at room temperature for 2.5 hours, the reaction mixture was cooled in an ice bath and 700 g of water was added. Subsequently, the resulting precipitate was collected by a Buchner funnel, washed twice with 1,000 g of water, and once with 150 g of THF and 400 g of hexane, then vacuum-dried to obtain 100 g of a diallyl compound (5-11) having the following properties.

Diallyl Compound (5-11)

Yellowish-White Powder $^1$H-NMR (500 MHz, THF-$d_8$): δ=7.50-7.40 (12H, m), 7.26-7.14 (18H, m), 5.82-5.73 (2H, m), 5.13 (2H, d), 5.01 (2H, d), 4.10-4.04 (2H, m), 3.94-3.88 (2H, m), 3.66-3.60 (2H, m), 3.36 (2H, d), 3.19 (2H, d)

(Synthesis of Diallyl Diol (5-III))

In a 2 L one-necked flask were charged 99.7 g of the diallyl compound (5-II) and 300 g of formic acid, and the mixture was stirred under nitrogen atmosphere at 60° C. for 1 day. Then, 300 g of isopropyl ether was added, and the mixture was further stirred at 60° C. for one day. The temperature was returned to room temperature, 300 g of methanol and 300 g of water were added to the mixture, and the generated insolubles were removed. The filtrate was concentrated and the obtained residue was purified by silica gel column chromatography to obtain 28.4 g of diallyldiol (5-III) having the following properties.

Diallyl diol (5-III)

Yellowish-White Powder $^1$H-NMR (500 MHz, CDCL$_3$): δ=5.91-5.82 (2H, m), 5.27 (2H, d), 5.19 (2H, d), 4.58 (2H, d), 4.24 (2H, d), 4.18-4.12 (2H, m), 4.06-4.00 (2H, m), 3.68-3.64 (2H, m)

(Synthesis of Silicone Pendant Diol Compound 1 (5-IV))

In a 300 mL three-necked flask were charged 28.0 g of the diallyldiol (5-III), 43.8 g of toluene and 0.1 g of PL50N, and the mixture was heated to 55° C. under nitrogen atmosphere. Subsequently, 61.7 g of heptamethyltrisiloxane was added dropwise over one and a half hours using a 100 mL dropping funnel. After completion of the dropwise addition, the mixture was stirred for 7 hours, then returned to room temperature, and 1 g of activated carbon was added. After stirring for 2 hours, the mixture was filtered through celite, and the obtained solution was concentrated under reduced pressure to obtain 67.1 g of a silicone pendant diol compound 1 (5-IV) having the following properties.

Silicone Pendant Diol Compound 1 (5-IV)

Yellow Oil $^1$H-NMR (500 MHz, CDCl$_3$): δ=4.59 (2H, d), 4.23 (2H, d), 3.61-3.54 (4H, m), 3.39-3.34 (2H, m), 1.57-1.51 (4H, m), 0.45-0.39 (4H, m), 0.08 (36H, s), 0.01 (6H, s)

[Synthesis of Silicone Pendant Diol Compounds 2 to 4, and Comparative Silicone Pendant Diol Compound 1]

The silicone pendant diol compounds 2 to 4, and the comparative silicone pendant diol compound 1 were synthesized in the same manner as the hydrosilylation reaction shown in the reaction formula described in the formula (5) except for the diol used.

The silicone pendant diol compounds 1 to 4, the comparative silicone pendant diol compound 1, the isocyanate compounds 1 to 5, and the hydroxyl compounds 1 to 7 incorporated in the composition for forming the stretchable film are shown below.

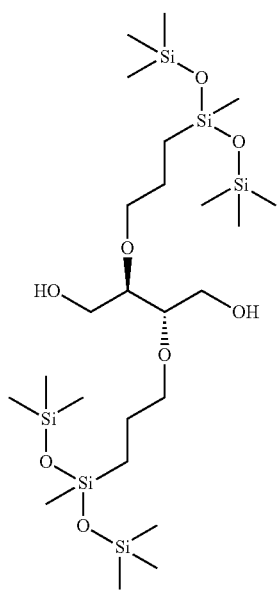
Silicone pendant diol compound 1
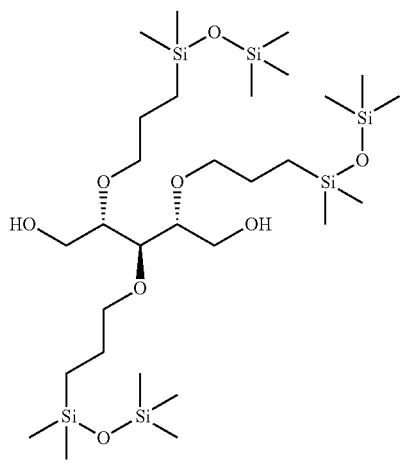
Silicone pendant diol compound 2
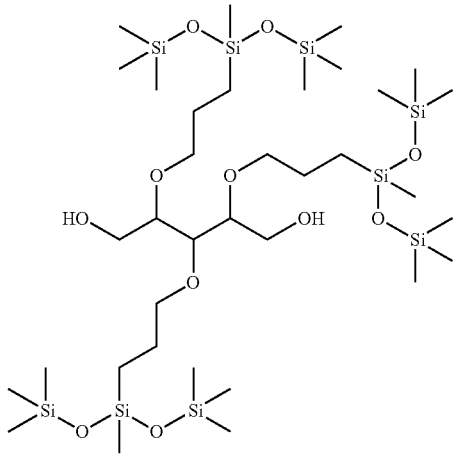
Silicone pendant diol compound 3
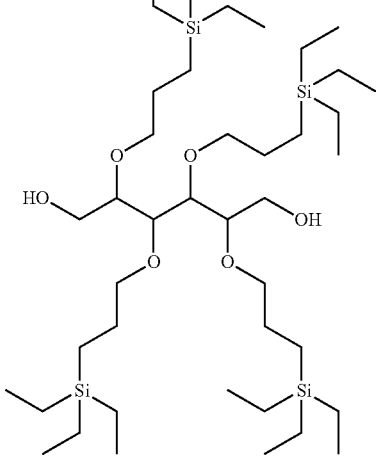
Silicone pendant diol compound 4
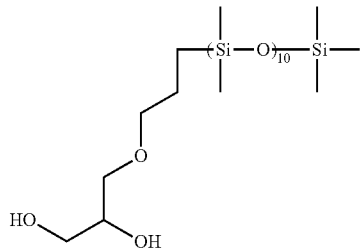
Comparative silicone pendant diol compound 1
The number of repetitions in the formula indicates the average value.
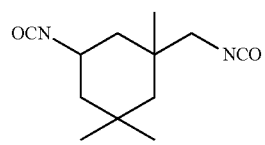
Isocyanate compound 1
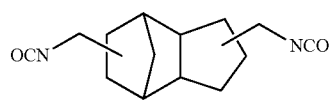
Isocyanate compound 2
Isocyanate compound 3

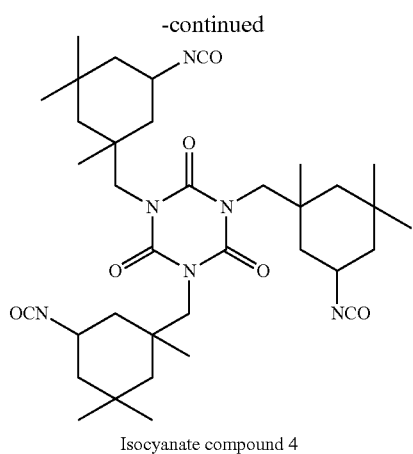

Isocyanate compound 4

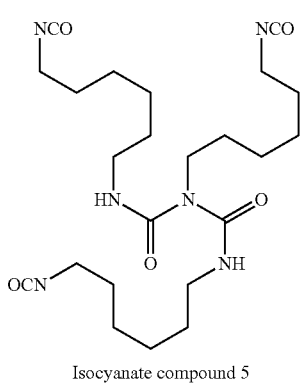

Isocyanate compound 5

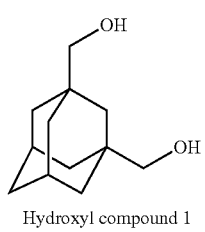

Hydroxyl compound 1

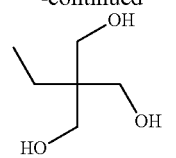

Hydroxyl compound 2

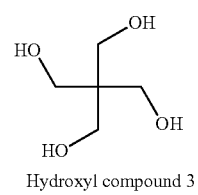

Hydroxyl compound 3

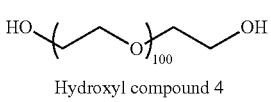

Hydroxyl compound 4

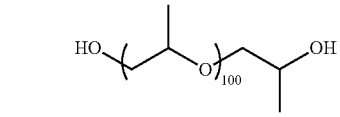

Hydroxyl compound 5

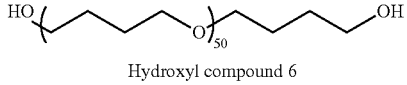

Hydroxyl compound 6

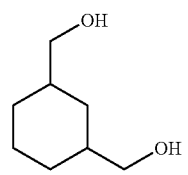

Hydroxyl compound 7

The number of repetitions in the formula indicates the average value.

Silicone pendant urethane (meth)acrylates 1 to 7, and Comparative urethane (meth)acrylate 1 blended as a compound having a (meth)acrylate group at the terminal in a composition for forming a stretchable film are shown below.

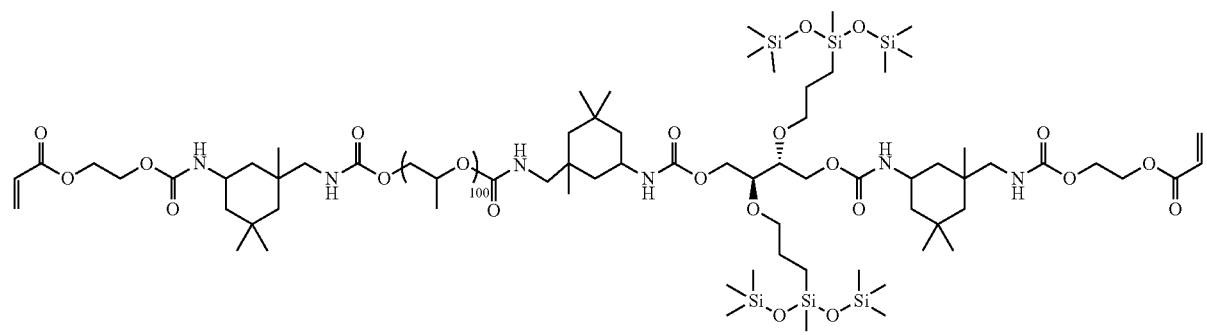

Silicone pendant urethane (meth)acrylate 1

-continued
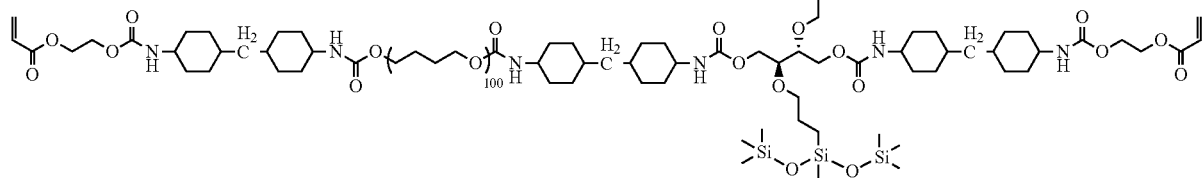
Silicone pendant urethane (meth)acrylate 2
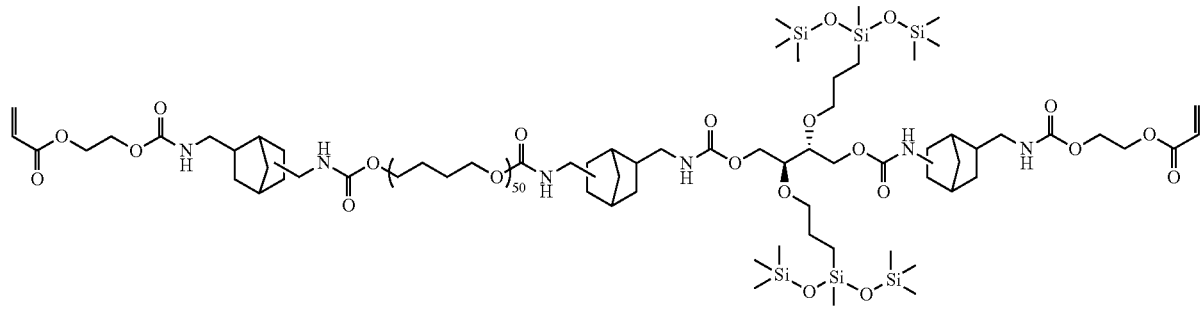
Silicone pendant urethane (meth)acrylate 3
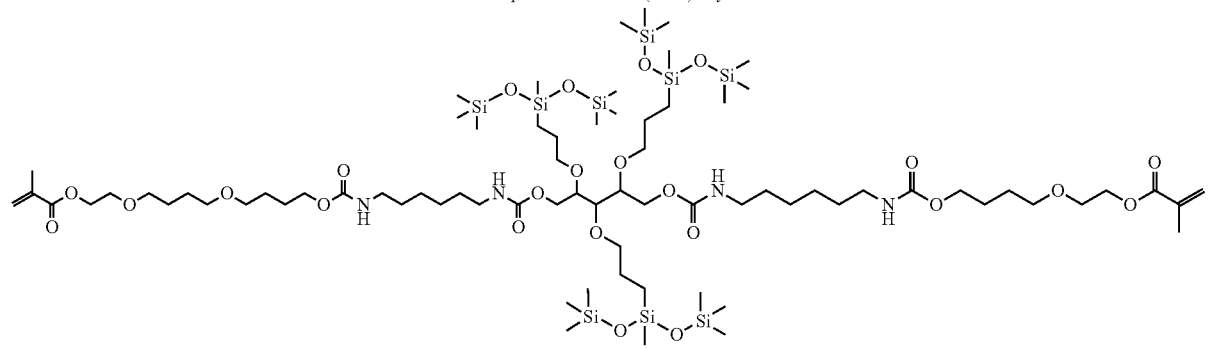
Silicone pendant urethane (meth)acrylate 4
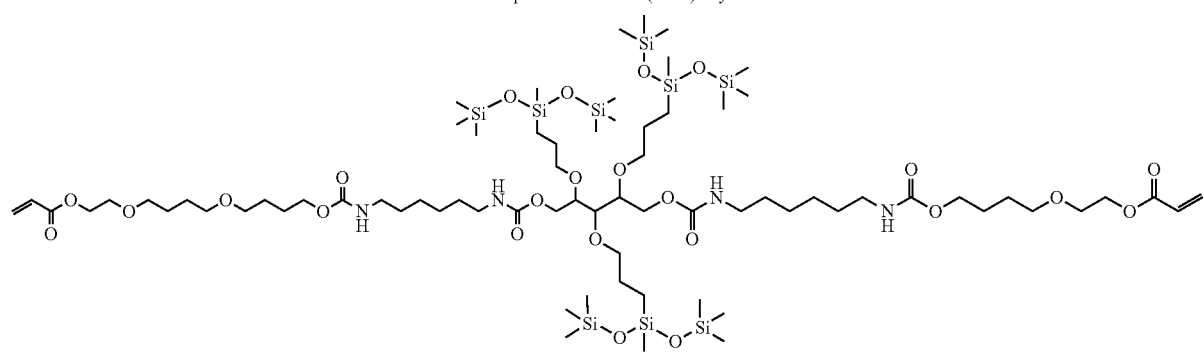
Silicone pendant urethane (meth)acrylate 5
The number of repetitions in the formula indicates the average value.

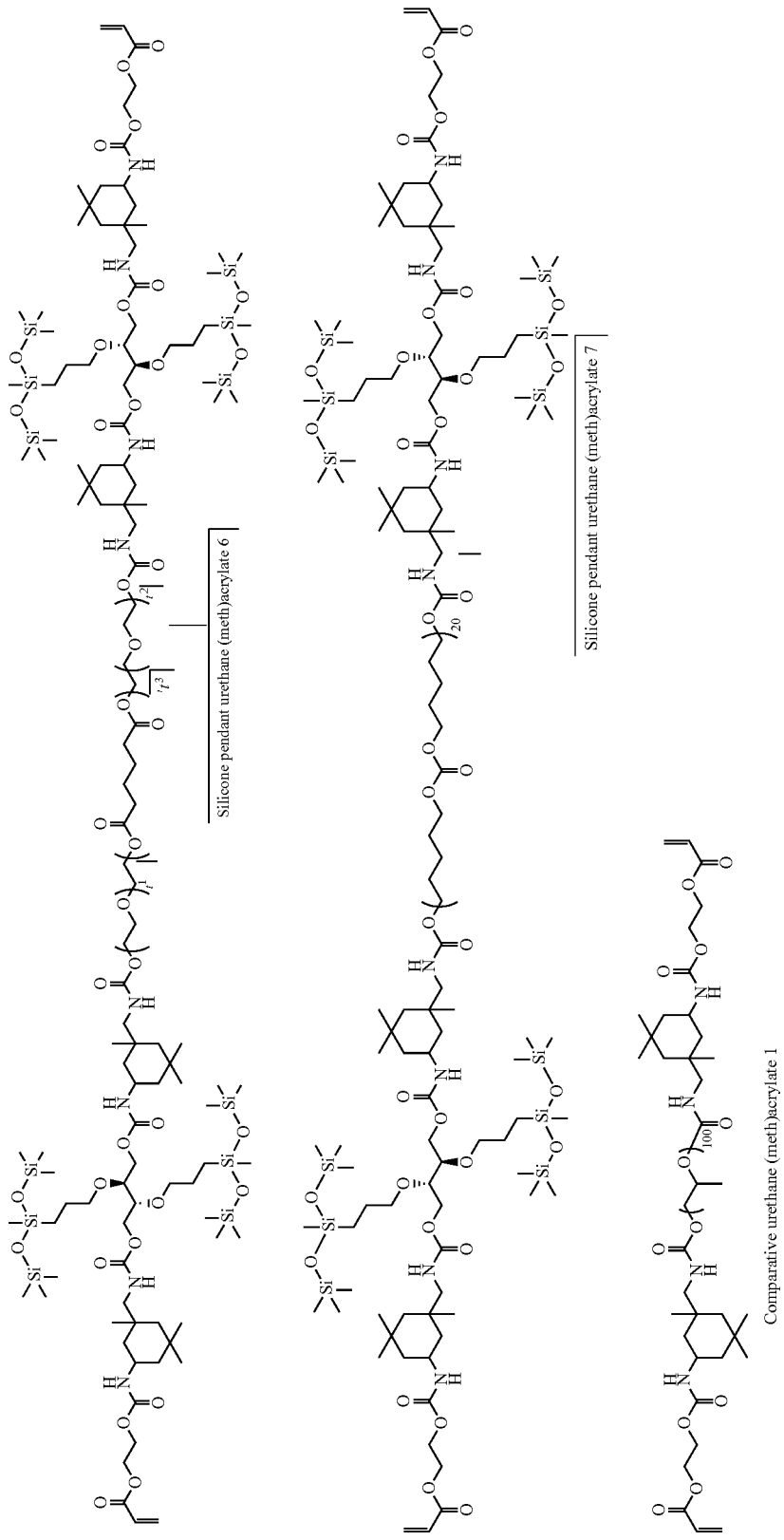

the number of repetitions in the formula represents the average value, $t^1+t^2$ has an average of 20, and $t^3$ has an average of 10.

The photo-radical generators 1 to 3, and the thermal radical generator 1 blended as an additive in the composition for forming the stretchable film are shown below.

Photo-radical generator 1: 4,4'-Dimethoxybenzyl

Photo-radical generator 2: 2,2-Dimethoxy-2-phenylacetophenone

Photo-radical generator 3: (±)-Camphourquinone

Thermal radical generator 1: Dimethyl 2,2'-azobis(2-methylpropionate)

The organic solvent blended in the composition for forming the stretchable film is shown below. Organic solvent: propylene glycol monomethyl ether acetate (PGMEA)

The monomer having an alkyl group or an aryl group blended in the composition for forming the stretchable film is shown below.

Monomer Having an Alkyl Group or an Aryl Group:

Isobornyl Acrylate

EXAMPLES, AND COMPARATIVE EXAMPLE

With the composition described in Table 1, a silicone pendant diol compound, an isocyanate compound, a hydroxyl compound and an additive were mixed, and defoamed to prepare the composition for forming the stretchable film (the stretchable film materials 1-1 to 1-6, and Comparative stretchable film material 1-1). After deaeration, the stretchable film materials 1-1 to 1-6, and Comparative stretchable film material 1-1 were each coated onto the polyethylene substrate by a bar coating method, and baked at 130° C. for 20 minutes to prepare a stretchable film (Films 1-1 to 1-6, and Comparative Film 1-1) on the substrate. In addition, the ratio of the number of the moles of hydroxyl groups and isocyanate groups in the composition for forming the stretchable film is also shown in Table 1.

TABLE 1

| Stretchable film material | Silicone pendant diol compound (part by mass) | Isocyanate compound (part by mass) | Hydroxyl compound (part by mass) | Molar ratio of hydroxyl/ isocyanate |
|---|---|---|---|---|
| Stretchable film material 1-1 | Silicone pendant diol compound 1 (3) | Isocyanate compound 1 (16) | Hydroxyl compound 1 (10) Hydroxyl compound 2 (2) Hydroxyl compound 4 (5) | 1.10 |
| Stretchable film material 1-2 | Silicone pendant diol compound 2 (3) | Isocyanate compound 2 (12) | Hydroxyl compound 5 (10) Hydroxyl compound 3 (3) | 1.07 |
| Stretchable film material 1-3 | Silicone pendant diol compound 3 (5) | Isocyanate compound 3 (9) | Hydroxyl compound 6 (10) Hydroxyl compound 3 (3) | 1.06 |
| Stretchable film material 1-4 | Silicone pendant diol compound 4 (5) | Isocyanate compound 3 (12) | Hydroxyl compound 6 (10) Hydroxyl compound 7 (5) Hydroxyl compound 3 (3) | 1.17 |
| Stretchable film material 1-5 | Silicone pendant diol compound 4 (5) | Isocyanate compound 1 (8) Isocyanate compound 4 (3) | Hydroxyl compound 6 (10) Hydroxyl compound 7 (5) | 1.06 |
| Stretchable film material 1-6 | Silicone pendant diol compound 4 (5) | Isocyanate compound 1 (8) Isocyanate compound 5 (2) | Hydroxyl compound 6 (10) Hydroxyl compound 7 (5) | 1.07 |
| Comparative stretchable film material 1-1 | Comparative silicone pendant diol compound 1 (5) | Isocyanate compound 1 (16) | Hydroxyl compound 1 (10) Hydroxyl compound 2 (2) Hydroxyl compound 4 (5) | 1.14 |

With the composition described in Table 2, a silicone pendant urethane (meth)acrylate, photo-radical generators 1 to 3, a thermal radical generator 1 and isobornyl acrylate were mixed to prepare composition for forming the stretchable films (Stretchable film materials 2-1 to 2-6, and Comparative stretchable film material 2-1). The prepared compositions for forming the stretchable film were each coated onto the polyethylene substrate by a bar coating method, and in the case of the stretchable film materials 2-1 to 2-5, and Comparative stretchable film material 2-1, a coating film of the composition was cured by irradiating light of 500 mJ/cm$^2$ with a xenon lamp of 1,000 W under nitrogen atmosphere to produce the stretchable films (Films 2-1 to 2-5, and Comparative Film 2-1). In the case of the stretchable film material 2-6, the prepared composition for forming the stretchable film was coated onto the polyethylene substrate by a bar coating method, and baked at 120° C. for 20 minutes under nitrogen atmosphere to produce the stretchable film (Film 2-6).

TABLE 2

| Comparative stretchable film material | Silicone pendant urethane (meth)acrylate (parts by mass) | Additive (parts by mass) |
|---|---|---|
| Stretchable film material 2-1 | Silicone pendant urethane (meth)acrylate 1 (70) | Photo-radical generator 1 (3) Isobornyl acrylate (30) |
| Stretchable film material 2-2 | Silicone pendant urethane (meth)acrylate 2 (85) Silicone pendant urethane (meth)acrylate 4 (15) | Photo-radical generator 2 (3) |
| Stretchable film material 2-3 | Silicone pendant urethane (meth)acrylate 3 (75) Silicone pendant urethane (meth)acrylate 5 (25) | Photo-radical generator 3 (3) |
| Stretchable film material 2-4 | Silicone pendant urethane (meth)acrylate 1 (60) Silicone pendant urethane (meth)acrylate 6 (40) | Photo-radical generator 3 (3) |
| Stretchable film material 2-5 | Silicone pendant urethane (meth)acrylate 2 (70) Silicone pendant urethane (meth)acrylate 7 (30) | Photo-radical generator 3 (3) |
| Stretchable film material 2-6 | Silicone pendant urethane (meth)acrylate 2 (70) Silicone pendant urethane (meth)acrylate 7 (30) | Thermal radical generator 1 (3) |
| Comparative stretchable film material 2-1 | Comparative urethane (meth)acrylate 1 (70) | Photo-radical generator 1 (3) Isobornyl acrylate (30) |

(Measurement of Film Thickness, Contact Angle, Stretching Property and Strength)

The film thickness and the contact angle of water on the surface of the stretchable film after curing were measured. Also, after measuring the contact angle of water on the surface of the stretchable film, the stretchable film was peeled off from the substrate and the stretching property and the strength were measured by a method in accordance with JIS K 6251. The results are shown in Table 3.

TABLE 3

| Stretchable film | Stretchable film material | Film thickness (um) | Contact angle (degree) | Stretching property (%) | Strength (MPa) |
|---|---|---|---|---|---|
| Example 1-1 | Film 1-1 | Stretchable film material 1-1 | 330 | 104 | 390 | 5.7 |
| Example 1-2 | Film 1-2 | Stretchable film material 1-2 | 340 | 103 | 410 | 4.3 |
| Example 1-3 | Film 1-3 | Stretchable film material 1-3 | 330 | 108 | 390 | 12.3 |
| Example 1-4 | Film 1-4 | Stretchable film material 1-4 | 366 | 106 | 250 | 15.7 |
| Example 1-5 | Film 1-5 | Stretchable film material 1-5 | 360 | 104 | 330 | 12.0 |
| Example 1-6 | Film 1-6 | Stretchable film material 1-6 | 355 | 103 | 350 | 13.2 |
| Example 2-1 | Film 2-1 | Stretchable film material 2-1 | 290 | 104 | 390 | 3.1 |
| Example 2-2 | Film 2-2 | Stretchable film material 2-2 | 280 | 105 | 220 | 12.3 |
| Example 2-3 | Film 2-3 | Stretchable film material 2-3 | 410 | 104 | 270 | 11.8 |
| Example 2-4 | Film 2-4 | Stretchable film material 2-4 | 360 | 103 | 250 | 8.7 |
| Example 2-5 | Film 2-5 | Stretchable film material 2-5 | 360 | 102 | 180 | 19.4 |
| Example 2-6 | Film 2-6 | Stretchable film material 2-6 | 290 | 105 | 160 | 21.2 |
| Comparative example 1-1 | Comparative Film 1-1 | Comparative stretchable film material 1-1 | 300 | 93 | 350 | 2.3 |
| Comparative example 2-1 | Comparative Film 2-1 | Comparative stretchable film material 2-1 | 330 | 81 | 410 | 1.1 |

As shown in Table 3, the stretchable films in Examples 1-1 to 1-6 in which a diol compound pendant with two silicon-containing groups is reacted with an isocyanate compound, and Examples 2-1 to 2-6 in which a material pendant with two silicon-containing groups is used as a compound having a (meth)acrylate group at the terminal have high contact angle of water, that is, a stretchable film having high water repellency, and simultaneously having excellent stretchability and strength can be obtained.

On the other hand, the stretchable film of Comparative example 2-1 using a compound having no siloxane bond as a compound having a (meth)acrylate group at the terminal was low in contact angle of water as compared with those of Examples 1-1 to 1-6, and 2-1 to 2-6, that is, water repellency was low and strength was inferior. Also, the stretchable film of Comparative example 1-1 in which a diol compound pendant with a conventional linear silicone is reacted with an isocyanate compound has a high contact angle of water, but it was inferior in strength as compared with, in particular, that of Example 1-1 that has the same composition other than the silicon-containing groups.

From the above, according to the stretchable films of the present invention, they have excellent stretchability and strength, and also has excellent water repellency on the surface of the film, so it can be clarified that they have excellent characteristics as a film covering stretchable wiring used for wearable devices and the like.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A urethane resin having a structure represented by the following general formula (3),

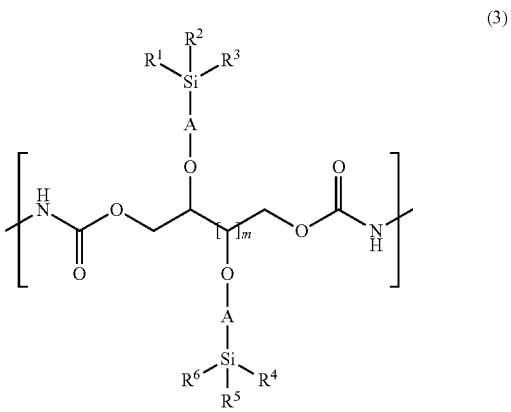

(3)

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by —$(OSiR^7R^8)_n$—$OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; and "m" is an integer in the range of 1 to 3.

2. The urethane resin according to claim 1, wherein the urethane resin is a material having a structure which has a (meth)acrylate group at a terminal and represented by the following general formula (4), (4)

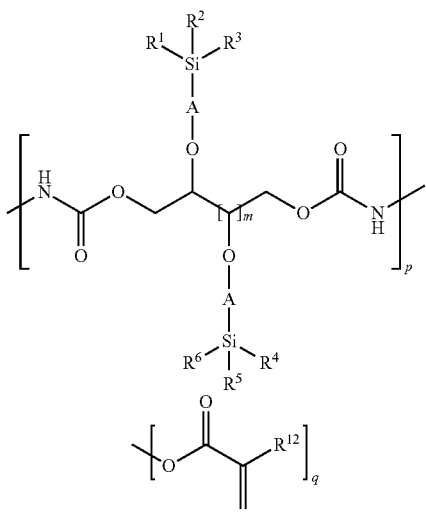

wherein, $R^1$ to $R^6$, A, and "m" represent the same meanings as above; $R^{12}$ represents a hydrogen atom or a methyl group; and "p", and "q" are numbers of units in one molecule and are integers in the range of $1 \leq p \leq 100$, and $1 \leq q \leq 3$.

3. A stretchable film which comprises the urethane resin according to claim 2.

4. The stretchable film according to claim 3, wherein the stretchable film is used as a film which is in contact with a conductive wire having stretchability.

5. The stretchable film according to claim 3, wherein the stretchable film is a material having a stretching property of 40 to 500% in a tensile test regulated by JIS K 6251.

6. The stretchable film according to claim 5, wherein the stretchable film is used as a film which is in contact with a conductive wire having stretchability.

7. A stretchable film which comprises the urethane resin according to claim 1.

8. The stretchable film according to claim 7, wherein the stretchable film is used as a film which is in contact with a conductive wire having stretchability.

9. The stretchable film according to claim 7, wherein the stretchable film is a material having a stretching property of 40 to 500% in a tensile test regulated by JIS K 6251.

10. The stretchable film according to claim 9, wherein the stretchable film is used as a film which is in contact with a conductive wire having stretchability.

11. A method for forming a stretchable film which comprises
forming a film of a compound having a (meth)acrylate group at a terminal represented by the following general formula (4), and curing the film by heating and/or irradiating light, (4)

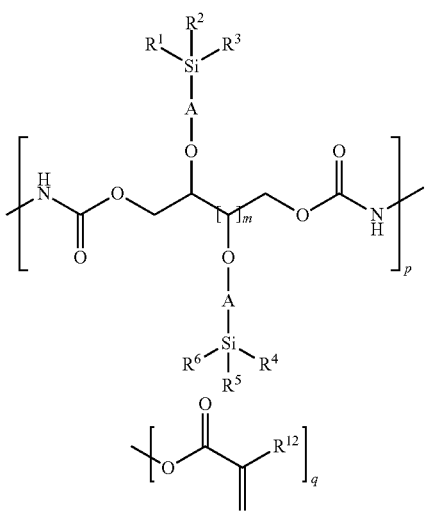

wherein, $R^1$, $R^2$, $R^3$, $R^4$, $R^5$, and $R^6$ each represents a linear, branched or cyclic alkyl group having 1 to 6 carbon atoms, a phenyl group, a 3,3,3-trifluoropropyl group or a group represented by $-(OSiR^7R^8)_n-OSiR^9R^{10}R^{11}$; $R^7$, $R^8$, $R^9$, $R^{10}$ and $R^{11}$ are the same as those of $R^1$ to $R^6$; "n" is an integer in the range of 0 to 100; A represents a linear or branched alkylene group having 3 to 6 carbon atoms; $R^{12}$ represents a hydrogen atom or a methyl group; "m" is an integer in the range of 1 to 3; and "p" and "q" are numbers of units in one molecule and are integers in the range of $1 \leq p \leq 100$, and $1 \leq q \leq 3$.

* * * * *